United States Patent [19]
Johnson et al.

[11] Patent Number: 5,317,715
[45] Date of Patent: * May 31, 1994

[54] REDUCED INSTRUCTION SET COMPUTER SYSTEM INCLUDING APPARATUS AND METHOD FOR COUPLING A HIGH PERFORMANCE RISC INTERFACE TO A PERIPHERAL BUS HAVING DIFFERENT PERFORMANCE CHARACTERISTICS

[75] Inventors: William M. Johnson, San Jose; Timothy A. Olson, Sunnyvale; Drew J. Dutton, Santa Monica; Sherman Lee, Palos Verdes Estates; David W. Stoenner, El Toro, all of Calif.

[73] Assignee: Advanced Micro Devices, Inc., Sunnyvale, Calif.

[*] Notice: The portion of the term of this patent subsequent to Aug. 25, 2009 has been disclaimed.

[21] Appl. No.: 911,783

[22] Filed: Jul. 10, 1992

Related U.S. Application Data

[63] Continuation of Ser. No. 593,540, Oct. 3, 1990, abandoned, which is a continuation of Ser. No. 133,092, Dec. 15, 1987, abandoned.

[51] Int. Cl.[5] ..................... G06F 13/00; G06F 13/23
[52] U.S. Cl. ................................. 395/425; 395/500; 364/DIG. 1
[58] Field of Search ............... 395/425, 250, 275, 500, 395/325

[56] References Cited

U.S. PATENT DOCUMENTS

| | | | |
|---|---|---|---|
| 4,181,934 | 1/1980 | Marenin | 364/200 |
| 4,296,464 | 10/1981 | Woods et al. | 364/200 |
| 4,309,754 | 1/1982 | Dinwiddig Jr. | 364/200 |
| 4,384,327 | 5/1983 | Conway et al. | 364/200 |
| 4,447,878 | 5/1984 | Kinnie et al. | 364/200 |
| 4,494,190 | 1/1985 | Peters | 364/200 |
| 4,608,631 | 8/1986 | Stiffer et al. | 364/200 |
| 4,700,340 | 10/1987 | Beranek et al. | 371/8.1 |
| 4,716,525 | 12/1987 | Gilanui et al. | 364/200 |
| 4,734,852 | 3/1988 | Johnson et al. | 364/200 |
| 4,775,976 | 10/1988 | Yokoyama | 371/9.1 |
| 4,823,256 | 4/1989 | Bishop et al. | 371/9.1 |
| 4,835,773 | 5/1989 | Kuwahara et al. | 371/8.1 |
| 4,878,166 | 10/1989 | Johnson et al. | 375/425 |
| 4,947,366 | 8/1990 | Johnson | 395/275 |
| 5,142,672 | 8/1992 | Johnson et al. | 395/500 |

*Primary Examiner*—Joseph I. Dixon
*Assistant Examiner*—Michael A. Whitfield
*Attorney, Agent, or Firm*—Lowe, Price, LeBlanc & Becker

[57] ABSTRACT

Methods and apparatus are disclosed for transferring data to and from the Local Bus of a reduced instruction set computer (RISC) system, to which a first set of high performance devices, including at least one central processor ("CPU"), is attached, and a Remote Bus, to which a second set of relatively lower performance devices is attached, in a manner that does not limit the RISC processor's performance. According to the preferred embodiment of the invention, a RISC architecture is disclosed that includes a novel data transfer controller ("DTC"), or set of DTCs, suitable for performing the aforesaid data transfer function between the high performance Local Bus and one or more Remote Buses to which complete subsystems or peripherals, typically having different (and lower) performance characteristics, are attached. The resulting RISC arthitecture permits commercially available peripherals and subsystems to be used with high performance RISC processors without limiting RISC system performance.

9 Claims, 13 Drawing Sheets

REDUCED INSTRUCTION SET COMPUTER SYSTEM INCLUDING APPARATUS AND METHOD FOR COUPLING A HIGH PERFORMANCE RISC INTERFACE TO A PERIPHERAL BUS HAVING DIFFERENT PERFORMANCE CHARACTERISTICS

This application is a continuation of application Ser. No. 07/593,540 filed Oct. 3, 1990 now abandoned, which is a continuation application of application Ser. No. 07/133,092, filed Dec. 15, 1987 now abandoned.

BACKGROUND OF THE INVENTION

1. Field of the Invention

The invention relates generally to methods and apparatus used for transferring data to and from the Local Bus of a reduced instruction set computer (RISC) system, to which a first set of high performance devices, including at least one central processor ("CPU"), is attached, and a Remote Bus, to which a second set of relatively lower performance devices is attached, in a manner that does not limit the RISC processor's performance. The invention more particularly relates to a RISC architecture that includes a novel data transfer controller ("DTC"), or set of DTCs, suitable for performing the aforesaid data transfer function between the high performance Local Bus and one or more Remote Buses to which complete subsystems or peripherals, typically having different (and lower) performance characteristics, are attached.

2. Description of the Related Art

Methods and apparatus for achieving a high performance system interface between a RISC processor and a set of devices, including memory means internal to the RISC system, are described in copending application Ser. No. 012,226, now U.S. Pat. No. 4,851,990, filed Feb. 19, 1987, assigned to Advanced Micro Devices, Inc. This copending application is hereby incorporated by reference. The novel system interface taught in the copending application includes, according to its preferred embodiment, two 32 bit wide buses referred to as the "Address Bus" and "Data Bus". For the purpose of this application these two buses collectively correspond to the Local Bus.

In order to permit a RISC system to utilize and access a wide array of commercially available peripheral devices that typically operate at lower speeds than a RISC processor, the Local Bus needs to be coupled in some manner to a Remote Bus to which one or more of said peripheral devices are connected. The Remote Bus could also be a complete I/O subsystem with its own processor.

Currently, no devices or methods are known which interconnect and permit data transfers between buses having different performance characteristics (like the aforesaid Local Bus and Remote Bus), while at the same time not appreciably having an affect on the performance of the devices attached to the buses. In addressing this problem it would be a particularly desirable feature to insulate the performance of any high speed processor, e.g., a RISC processor attached to the Local Bus, from the comparatively lower performance of peripherals and/or any I/O subsystem connected to the Remote Bus. Ideally, the bandwidth and latency of accesses on the Local Bus needs to be decoupled from the bandwidth and latency of accesses on the Remote Bus, with concurrency between accesses on both buses.

Another problem to be solved is to provide methods and apparatus which allow I/O port and direct memory access ("DMA") operations to overlap with (i.e., operate in parallel with) devices attached to the Local Bus. Such a parallelism feature would further enhance the performance of the overall system of which the DTC forms a part and more particularly, in a RISC system, would free the RISC processor from having to wait for I/O completion.

I/O controller functions and DMA functions in and of themselves are well known in the prior art. However no combination of these functions are performed by any known methods or apparatus which, (1) interconnect and buffer a high performance RISC system Local Bus and a Remote Bus of the type described hereinbefore; (2) solve the aforementioned problem of interconnecting buses having different performance characteristics and (3) provide the parallelism referred to hereinbefore.

Furthermore, no DMA channel by itself is known which supports a bus to bus interface of the type described hereinabove, i.e., a DMA channel which accounts for differing bus characteristics and parallelism versus a DMA channel that only performs straight address sequencing.

Finally, although systems, such as the IBM 370 (a large main frame computer) are known that include a channel controller network with direct memory access features, no prior art is known at the microprocessor level, in particular in combination with a RISC processing system, that provides both DMA and I/O controller functions on a single chip. Such features would be a desirable adjunct to RISC processing systems which themselves are currently being fabricated at the chip level.

SUMMARY OF THE INVENTION

According to the invention, a reduced instruction set computer (RISC) system, including apparatus and methods for coupling a high performance RISC interface to a peripheral bus having different performance characteristics is disclosed. The high performance interface, also referred to hereinafter as the "Local Bus", has attached to it a first set of high performance devices, including at least one central processor ("CPU"). A "Remote Bus", to which a second set of relatively lower performance devices is attached, is interconnected to the Local Bus via at least one data transfer controller ("DTC"). Each DTC accomplishes the aforesaid transfer function in a manner that facilitates communication between the first and second set of devices while insulating the performance of the first set of devices from the comparatively lower performance of the second set of devices. Furthermore, each DTC includes a set of direct memory access ("DMA") channels and an input/output controller comprising a set of address mapped I/O ports. Both the DMA channels and I/O ports may be used to transfer data between the Local Bus and the Remote Bus. The resulting DTC interface between the Local Bus and a Remote Bus permits a wide performance range of standard peripheral devices to be attached to the RISC system in a manner that does not limit system performance.

It is an object of the invention to provide methods and apparatus that interconnect and permit data transfers between buses having different performance characteristics (like the aforesaid Local Bus and Remote-Bus), while at the same time not appreciably having an affect on the performance of the devices attached to the buses.

It is a further object of the invention to provide methods and apparatus which permit a RISC system to utilize and access a wide array of commercially available peripheral devices that typically operate at lower speeds than a RISC processor.

It is still a further object of the invention to insulate the performance of any high speed processor, e.g., a RISC processor attached to a Local Bus, from the comparatively lower performance of peripherals and/or any I/O subsystem connected to a Remote Bus in a manner in which the bandwidth and latency of accesses on the Local Bus may be decoupled from the bandwidth and latency of accesses on the Remote Bus, with concurrency between accesses on both buses.

Further yet, it is an object of the invention to provide methods and apparatus which allow I/O port and DMA operations to overlap with (i.e., operate in parallel with) devices attached to the Local Bus in order to enhance overall RISC system performance.

The preferred embodiment of the invention meets the aforesaid objects in the context of a RISC processing environment, with both the RISC processor and DTC being fabricated at the chip level.

The invention features a reduction in the amount of hardware required to connect peripherals on the Remote Bus to the Local Bus. Additional features of the invention include the flexibility to perform bus sizing, data packing and unpacking, and conversions between byte and half-word data packed into words.

These and other objects and features of the invention will become apparent to those skilled in the art upon consideration of the following detailed description and the accompanying Drawing, in which like reference designations represent like features throughout the figures.

DETAILED DESCRIPTION

According to the preferred embodiment of the invention, the DTC implements four address-mapped input/output ports on the Local Bus. These ports provide a gateway from the Local Bus to the Remote Bus, so that a processor attached to the Local Bus can directly access devices and memories on the Remote Bus.

Each I/O port, according to the preferred embodiment of the invention, is a power-of-two number of bytes in size, and can begin on any corresponding power-of-two address boundary on the Local Bus. The ports can appear on the Local Bus in either the data-memory address space or the I/O address space. These address spaces are defined in the incorporated copending application. The ports are address-mapped, so that addressing on the Local Bus is independent of addressing on the Remote Bus. Optional read-ahead and write-behind features on these ports allow Remote-Bus accesses to be overlapped with Local-Bus accesses. These features will be described in detail hereinafter.

The DTC also implements four buffered DMA channels, supporting DMA transfers from the Remote Bus to the Local Bus, and from the Local Bus to the Remote Bus. For DMA accesses, data, according to the preferred embodiment of the invention, is buffered in one of four 64-word queues. There is one queue per DMA channel.

The DMA queues reduce the overhead of DMA transfers on the Local Bus, by allowing the transfers of large amounts of data for each Local-Bus acquisition. This is particularly effective if the burst-mode capability, as described in the incorporated copending application, of the Local Bus is used. The queues may be manipulated directly by software executing on, for example, the RISC processor.

Figure 1:
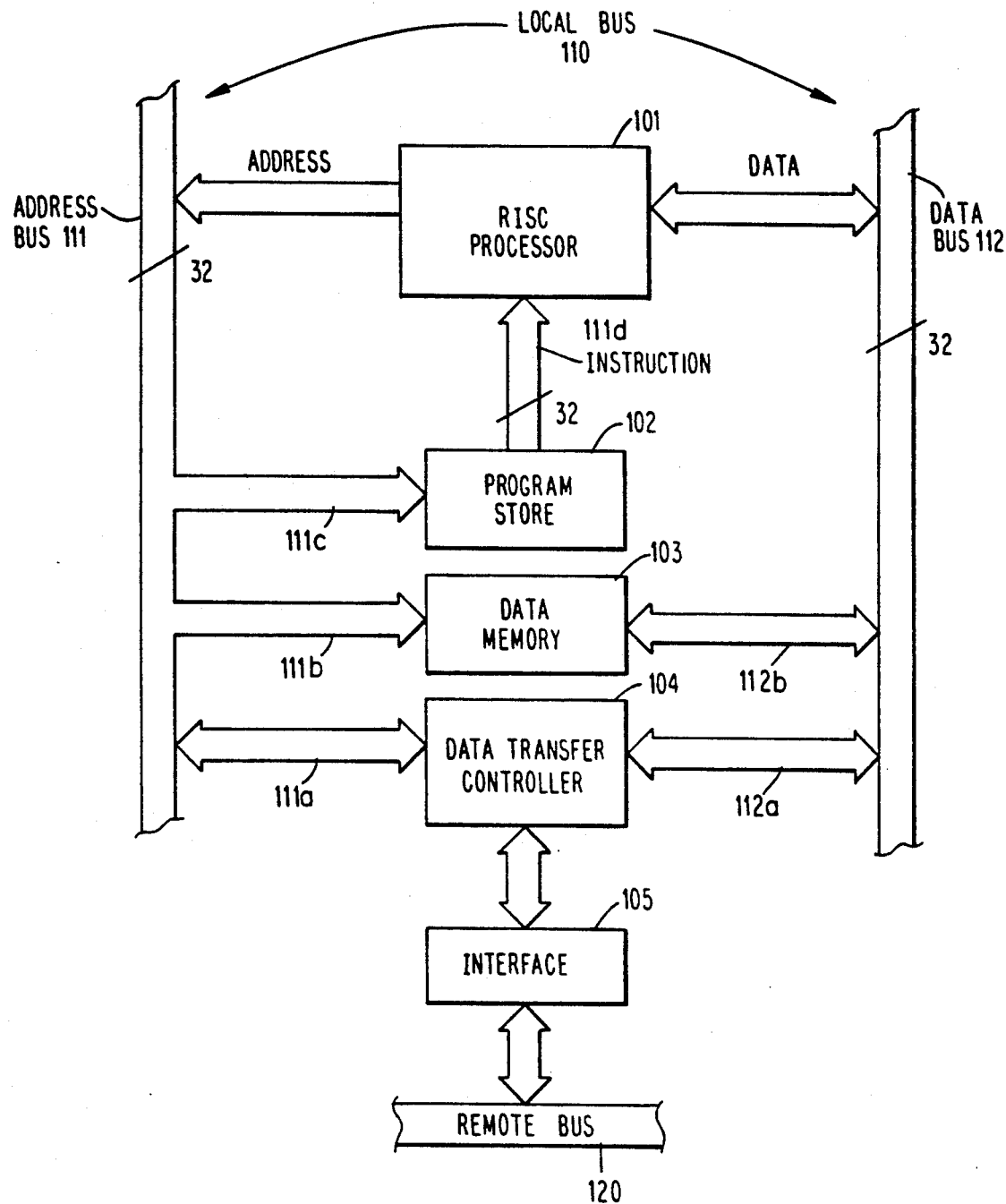
FIG. 1 depicts the novel DTC interfacing, in accordance with the preferred embodiment of the invention, with a RISC system via a Local Bus, and interfacing with a Remote Bus to which a set of peripherals, I/O subsystem, etc. may be attached.

As indicated hereinabove, FIG. 1 depicts, in block diagram form, the DTC interconnecting a Local Bus of a RISC system with a Remote Bus.

More particularly, the DTC, unit 104, is shown interconnected to 32 bit Address Bus 111 and 32 bit Data Bus 112 via links 111a and 112a respectively.

It should be noted that the Local Bus referred to herein and shown as Local Bus 110 in FIG. 1, is comprised of Address Bus 111 and Data Bus 112.

RISC processor 101, Program Store 102, Data Memory 103, the interconnections between these devices i.e., 111b, 111c, 111d and 112b, Address Bus 111 and Data Bus 112, are all described in detail in the incorporated copending application. The novel DTC will be described herein in the context of the RISC system set forth in the copending application for the sake of illustration only. One of ordinary skill in the art will readily appreciate how the DTC may be adapted to provide an interface for devices having different performance characteristics without departing from the spirit and scope of the invention described herein.

Not shown in copending application Ser. No. 012,226 are DTC 104 and interface unit 105. Interface unit 105 may, but is not required to, be used to interconnect DTC 104 to Remote Bus 120. Both units 104 and 105 will be described in detail hereinafter.

According to the preferred embodiment of the invention, DTC 104 is implemented in 1.2 micron CMOS technology, and is packaged in a 169-terminal pin-grid-array (PGA) package, using 148 signal pins, 20 power and ground pins, and one alignment pin.

Figure 2:
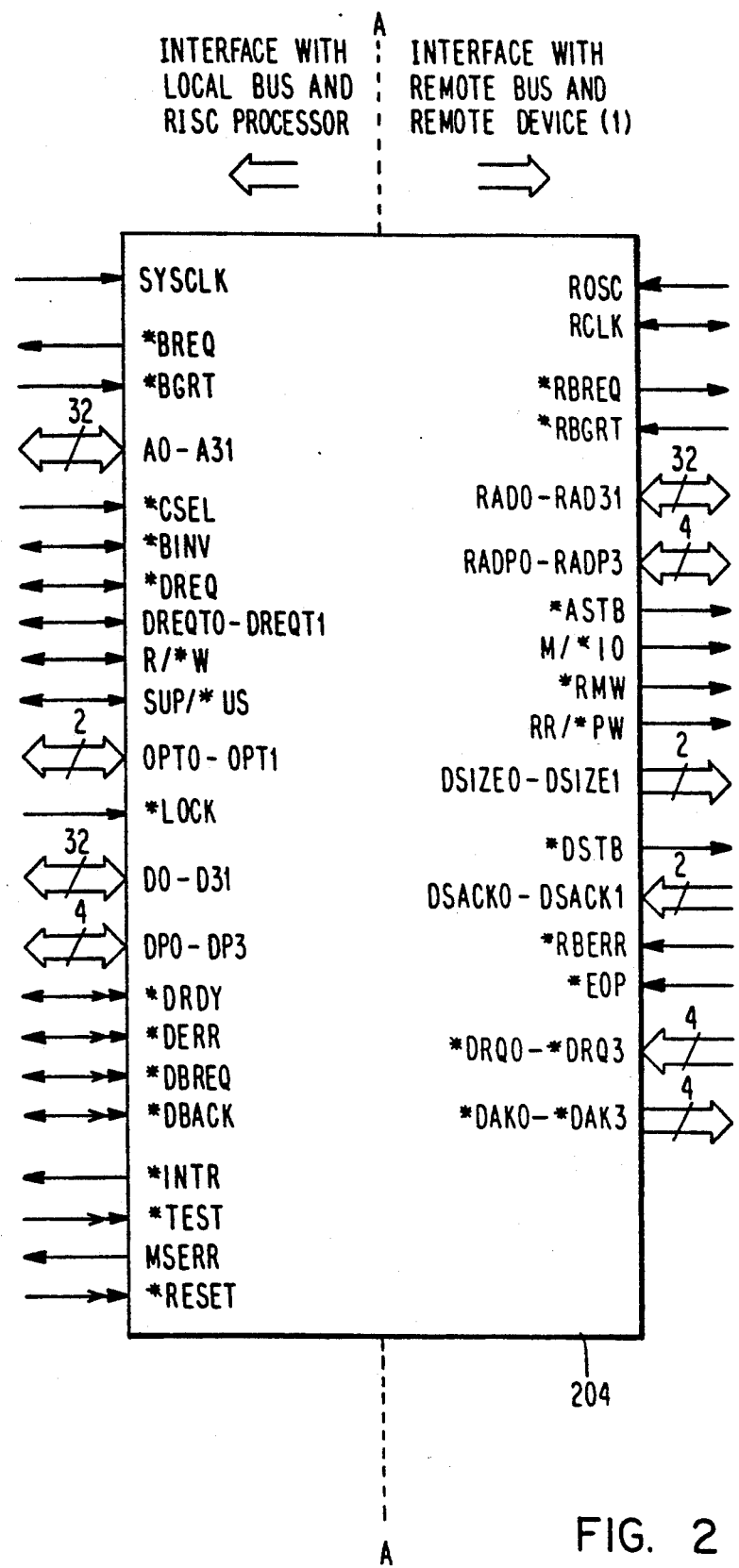
FIG. 2 depicts a pin-out diagram for an integrated circuit package that houses the novel DTC and facilitates its interconnection, in accordance with the preferred embodiment of the invention, to both a RISC system via a Local Bus and to a set of pheripherals via a Remote Bus.

FIG. 2 depicts a pin-out diagram for DTC 104. Integrated circuit package 204 of FIG. 2 houses the novel DTC and facilitates its interconnection, in accordance with the preferred embodiment of the invention, to both the RISC system, depicted in FIG. 1, via Local Bus 110, and to a set of peripherals via Remote Bus 120. The Local Bus connections to and from the DTC are shown on the left hand side of dotted line A—A in FIG. 2, and the Remote Bus connections to and from the DTC are shown on the right hand side of dotted line A—A in FIG. 2.

Before proceeding with the description of how the interface may be utilized, a set of DTC input and output signals has, in accordance with the preferred embodiment of the invention, been defined to facilitate the communication of both substantive and control information between DTC 104 and the devices connected to it via Buses 110 and 120. These signals are in one to one correspondence with the pins shown in the pin-out block depicted in FIG. 2.

A description of the signals input to and output from DTC 104 via the integrated circuit depicted in FIG. 2, along with the description of how the DTC may be utilized to support communications between Local Bus 110 and Remote Bus 120 (to be described in detail hereinafter), will illustrate the DTC's operability and utility. One of ordinary skill in the art will readily appreciate that the same teaching of how to use and control the DTC as an interface between a RISC Processor attached to Bus 110 and devices attached to Bus 120, may be extended to teach how to use and control the DTC to facilitate communication between sets of devices having different performance characteristics, attached to buses which are interconnected via the DTC.

For the sake of illustration and consistency with the incorporated copending application, a 32 bit instruction and data word architecture for the RISC system is assumed. One of ordinary skill in the art will appreciate that the illustrative embodiment in no way limits the implementation or scope of the invention with respect to computer systems having different word lengths.

Reference should now be made to FIG. 2 which depicts each input and output, to and from DTC 104 of the preferred embodiment of the invention, in the pin-out block form.

Focusing on the Local Bus inputs and outputs first, (left hand side of FIG. 2) Address Bus 111 and Data Bus 112 of FIG. 1 are depicted interconnected to block 104 of FIG. 2 via a 64 pin bus interconnect comprised of two sets of 32 pins each. The first set of 32 pins serves to interconnect bus 111 of FIG. 1 to DTC 104 and is labeled "A0-A31" in FIG. 2. The second set of 32 pins, for the separate and independent data bus, bus 112 of FIG. 1, is labeled "D0-D31" in FIG. 2

Before proceeding with the FIG. 2 pin description, it should be noted that the term "three state" is used hereinafter to describe signals which may be placed in the high-impedance state during normal operation. All outputs (except MSERR) may be placed in the high impedance state by the *TEST input. Both MSERR and *TEST will be described hereinafter with reference to the FIG. 2 pin description.

Returning to the description of the Local Bus signals, it should noted that all Local-Bus signals are synchronous to SYSCLK. SYSCLK is described in the incorporated copending application.

The A0-A31 (Address Bus) pins are bidirectional, synchronous and three state. The Address Bus transfers the byte address for all Local-Bus accesses except burst-mode accesses. For burst-mode accesses, it transfers the address for the first access in the sequence.

The D0-D31 (Data Bus) pins are bidirectional, synchronous and three state. The Data Bus transfers data to and from DTC 104 on the DTC's Local Bus side.

All of the other pins and signals on the Local Bus side of line A—A of FIG. 2 are, with the exception of *CSEL, DP0-DP3 and *INTR, described in the incorporated copending application. However, for the sake of clarity and completeness, a review of the purpose of each of these pins and signals in the context of DTC 104 will now be set forth in addition to the description of the pins and signals not described elsewhere. All the pin and signal descriptions to follow are in accordance with the preferred embodiment of the invention.

SYSCLK (System Clock) is an input to DTC 104. The input is a clock signal operating at the frequency of the Local Bus. DTC 104 uses this signal to synchronize all Local-Bus accesses.

*BREQ (Bus Request) is a synchronous, active LOW, DTC 104 output which is used to arbitrate for the Local Bus.

*BGRT (Bus Grant) is a synchronous, active LOW, DTC 104 input that informs DTC 104 that it has control of the Local Bus. It may be asserted even though *BREQ is inactive. If DTC 104 cannot use a granted Local Bus, it asserts *BINV (to be described hereinafter) to create an idle Local-Bus cycle.

*CSEL (Chip Select) is a synchronous, active LOW, DTC 104 input. DTC 104 may, according to the preferred embodiment of the invention, be configured to recognize a Local-Bus request either as the result of an address decode or as the result of an active level on *CSEL. This input is relevant only for accesses to internal DTC 104 registers which, to the extent required to teach the invention, will be described hereinafter.

*BINV (Bus Invalid) is a synchronous, active LOW, DTC 104 output that indicates that Address Bus 111 and related controls are invalid. It defines an idle cycle for the Local Bus. The pin itself is bidirectional.

*DREQ (Data Request) is a bidirectional pin. The signal on this pin is synchronous, three state and active LOW. This signal indicates an active data access on the Local Bus. When it is asserted, the address for the access appears on Address Bus 111.

DREQT0-DREQT1 (Data Request Type) signals are synchronous and three state. These signals specify the address-space for a data access on the Local Bus, as follows (the value "x" is a don't care):

| DREQT1 | DREQT0 | Meaning |
|--------|--------|---------|
| 0 | 0 | Instruction/data memory access |
| 0 | 1 | Input/output access |
| 1 | x | Coprocessor transfer (ignored by DTC 104) |

R/*W (Read/Write) is a bidirectional, synchronous, three state signal. When the DTC 104 is a Local Bus slave, this signal indicates whether data is being transferred from the Local Bus processor to DTC 104 (R/*W LOW) or from DTC 104 to the processor (R/*W HIGH). When DTC 104 is the Local Bus master, this signal indicates whether data is being transferred from DTC 104 to the Local Bus memory (R/*W LOW), or from the Local Bus memory to DTC 104 (R/*W HIGH).

SUP/*US (Supervisor/User Mode) is a bidirectional pin. The signal output on this pin is synchronous and three state. This output indicates the program mode of the Local Bus processor (Supervisor mode or User mode) during an access. These modes are defined in the incorporated copending application. The internal registers of DTC 104 are protected from User-mode access (either read or write). DTC 104 I/O ports may be protected from User-mode access as an option.

The OPT0-OPT1 (Option Control) signals are synchronous and three state. These signals specify the data length for Local Bus accesses. Byte and half-word accesses are valid only for accesses reflected on Remote Bus 120 via an I/O port. According to the embodiment of the invention being used for illustrative purposes, DTC 104 supports only 32-bit transfers on Remote Bus 120. The encoding of these signals is as follows:

| OPT1 | OPT0 | Data Width |
| --- | --- | --- |
| 0 | 0 | 32-bits |
| 0 | 1 | 8-bits |
| 1 | 0 | 16-bits |
| 1 | 1 | Invalid |

*LOCK (Lock) is a bidirectional, synchronous, active LOW signal used to indicate that an atomic read-modify-write cycle is to be performed on Remote Bus 120. It is significant only for an I/O port access. DTC 104 drives this signal HIGH when it is a local-bus master.

DP0-DP3 (Data Parity) are synchronous, three state, odd byte-parity signals for data stored in the Local Bus memory. The DP0 signal is the byte parity for D0-D7, the DP1 signal is the byte parity for D8-D15, and so on. During DMA transfers, DTC 104 allows parity to be transferred to Local Bus 110 from Remote Bus 120 and vice versa. DTC 104 can check for valid parity during either a DMA transfer or a remote-to-local transfer via an I/O port.

*DRDY (Data Ready) is a bidirectional signal that is synchronous and active LOW. For Local Bus reads, this input indicates that valid data is on Data Bus 111. For writes, it indicates that the access is complete, and that data need no longer be driven on Data Bus 112. When DTC 104 is the slave for a Local Bus access, it asserts *DRDY to indicate that it has successfully completed the access (unless *DERR is also asserted). When DTC 104 is the master for a Local Bus access, *DRDY indicates that the Local Bus memory has successfully completed the access (unless *DERR is also asserted).

The *DERR (Data Error) input is synchronous, active LOW and indicates that an error occurred during the current Local Bus access.

*DBREQ (Data Burst Request) is a bidirectional, synchronous, three state, active LOW signal used to establish a burst-mode data access on the Local Bus and to request data transfers during a burst-mode data access.

*DBACK (Data Burst Acknowledge) is a bidirectional, synchronous, active LOW signal that is active whenever a burst-mode data access has been established on the Local Bus (with DTC 104 as either a master or a slave for the access). It may be active even though no data are currently being accessed.

The *INTR (Interrupt Request) output is synchronous, active LOW and may be used by DTC 104 to signal interrupt or trap requests.

The *TEST (Test Mode) input is synchronous, active LOW and when active puts DTC 104 in a test mode. All outputs and bidirectional lines, except MSERR, are forced to the high-impedance state in this mode.

The MSERR (Master/Slave Error) output is synchronous, active HIGH and shows the result of the comparison of DTC 104 outputs with the signals provided internally to off-chip drivers. If there is a difference for any enabled driver, this signal is asserted.

Finally, for the Local Bus connections to DTC 104, the *RESET (Reset) input is an synchronous, active LOW signal that resets DTC 104.

On the Remote Bus side of the A—A line shown in FIG. 2 the pins and signals are for the following purposes.

It should be noted that all Remote Bus signals, according to the preferred embodiment of the invention, are synchronous to RCLK, which is a clock at the operating frequency of DTC 104's remote bus interface. RCLK is either an output generated at half the frequency of the ROSC input (to be explained hereinafter), or an input from an external clock generator. Remote Bus signals may be either synchronous or asynchronous to this clock.

The ROSC (Remote Oscillator) input is, when DTC 104 generates RCLK for the Remote Bus, an oscillator input at twice the frequency of RCLK. When RCLK is generated by an external clock generator, ROSC should be tied either HIGH or LOW.

The *RBREQ (Remote Bus Request) output is synchronous, active LOW and is used to arbitrate for Remote Bus 120.

The *RBGRT (Remote Bus Grant) input may be either asynchronous or synchronous, is active LOW and signals that DTC 104 has control of Remote Bus 120. It may be active even though *RBREQ is inactive. If DTC 104 has control of the Remote Bus, yet has no access to perform, it holds *ASTB (to be described hereinafter) inactive.

RAD0-RAD31 (Remote Address/Data Bus) is a bidirectional, Input/Output; asynchronous/synchronous, three state bus. The signals on this bus are multiplexed address/data signals for Remote Bus 120. When *ASTB is asserted, this bus holds the byte address of the Remote Bus access. When *DSTB is asserted, this bus is used to transfer data to and from DTC 104 and Remote Bus 120.

RADP0-RADP3 (Remote Address/Data Parity) is a set of bidirectional, three state, asynchronous/synchronous odd byte-parity signals for RAD0-RAD31. The RDP0 signal is the byte parity for RAD0-RAD7, the DP1 signal is the byte parity for RAD8-RAD15, and so on. During DMA transfers, DTC 104 allows parity to be transferred to Local Bus 110 from Remote Bus 120 and vice versa. DTC 104 can check for valid parity during either a DMA transfer or a remote-to-local transfer via an I/O port.

The *ASTB (Address Strobe) signal is a three state, synchronous, active LOW output signal asserted to indicate that DTC 104 is supplying a byte address for an access on the RAD0-RAD31 lines.

The M/*IO (Memory/I/O) output is three state, synchronous, and indicates whether the current transfer is occurring in the memory address space or the input-/output (I/O) address space of the remote bus.

The *RMW (Read-Modify-Write) output is three state, synchronous, and indicates that the current remote-bus access is an atomic read-modify-write signal. It is activated in response to an I/O port access on the Local Bus for which the *LOCK signal is active. *RMW is asserted for the duration of the read-modify-write sequence. Because this signal may be used for synchronization and exclusion, the remote bus must guarantee atomicity.

The RR/*RW (Remote Read/Remote Write) output is three state, synchronous, and determines the direction of a data transfer. A HIGH level indicates a transfer from Remote Bus 120 to DTC 104 (a read), and a LOW level indicates a transfer from DTC 104 to the remote system (a write).

The DSIZE0-DSIZE1 (Data Size Request) signals are three state, synchronous and are outputs reflecting the data width of the requested transfer. The encoding of these signals, according to the preferred embodiment of the invention, is as follows:

| DSIZE1 | DSIZE0 | Data Width |
|--------|--------|------------|
| 0 | 0 | 32 bits |
| 0 | 1 | 8 bits |
| 1 | 0 | 16 bits |
| 1 | 1 | Invalid |

*DSTB (Data Strobe) is a three state, synchronous, active LOW output indicating that the RAD0-RAD31 lines are available for a data transfer (a read), or that the RAD0-RAD31 lines contain valid data for a write.

The DSACK0-DSACK1 (Data Size Acknowledge) signals are asynchronous/synchronous input signals which indicate that a requested access is complete, and indicate the data width supported by the accessed device (8, 16, or 32 bits.) If the indicated data width is not sufficient for the transfer requested by DSIZE0-DSIZE1, a data-width exception occurs. The encoding of these signals is as follows:

| DSACK1 | DSACK0 | Data Width |
|--------|--------|------------|
| 0 | 0 | 32 bits |
| 0 | 1 | 8 bits |
| 1 | 0 | 16 bits |
| 1 | 1 | Invalid or no response |

It should be noted that *RBERR and *EOP (to be described hereinafter) provide an alternate means for terminating an access if there is no DSACK0-DSACK1 response.

*RBERR (Remote Bus Error) is an asynchronous/-synchronous, active LOW input which, during the data cycle of a Remote-Bus transfer, when active, indicates an error condition on the Remote Bus for the current transfer.

*EOP (End of Process) is an asynchronous/synchronous DTC input active LOW, which a Remote-Bus device may use to signal the end of a DMA transfer, regardless of any termination condition in the DTC, during the final DMA transfer. *EOP terminates the data cycle of a DMA transfer, regardless of DSACK0-DSACK3.

The *DRQ0-*DRQ3 (DMA Request) inputs are asynchronous/synchronous, active LOW, and are used by Remote-Bus devices to request DMA transfers. The inputs *DRQ0-*DRQ3 request DMA transfers for DMA Channels 0 through 3, respectively. According to the preferred embodiment of the invention, the relative priority of the request is programmable to be either fixed or rotating. DTC 104 asserts the corresponding DMA Acknowledge when the DMA transfer occurs. These inputs must be held active until the corresponding DMA Acknowledge output is asserted.

Finally, outputs *DAK0-*DAK3 (DMA Acknowledge) are synchronous, active LOW and are used to acknowledge that DTC 104 is performing a DMA transfer on Remote Bus 120. The outputs *DACK0-*DACK3 acknowledge DMA transfers for DMA channels 0 through 3, respectively.

Having described in detail a set of DTC input and output signals useful for controlling the interface between Local Bus 110 and Remote Bus 120, a detailed functional description of the DTC itself and how it supports a variety of data and address transfers, will now be set forth. This description will complete the demonstration of both the operation and the utility of the invention.

Figure 3:
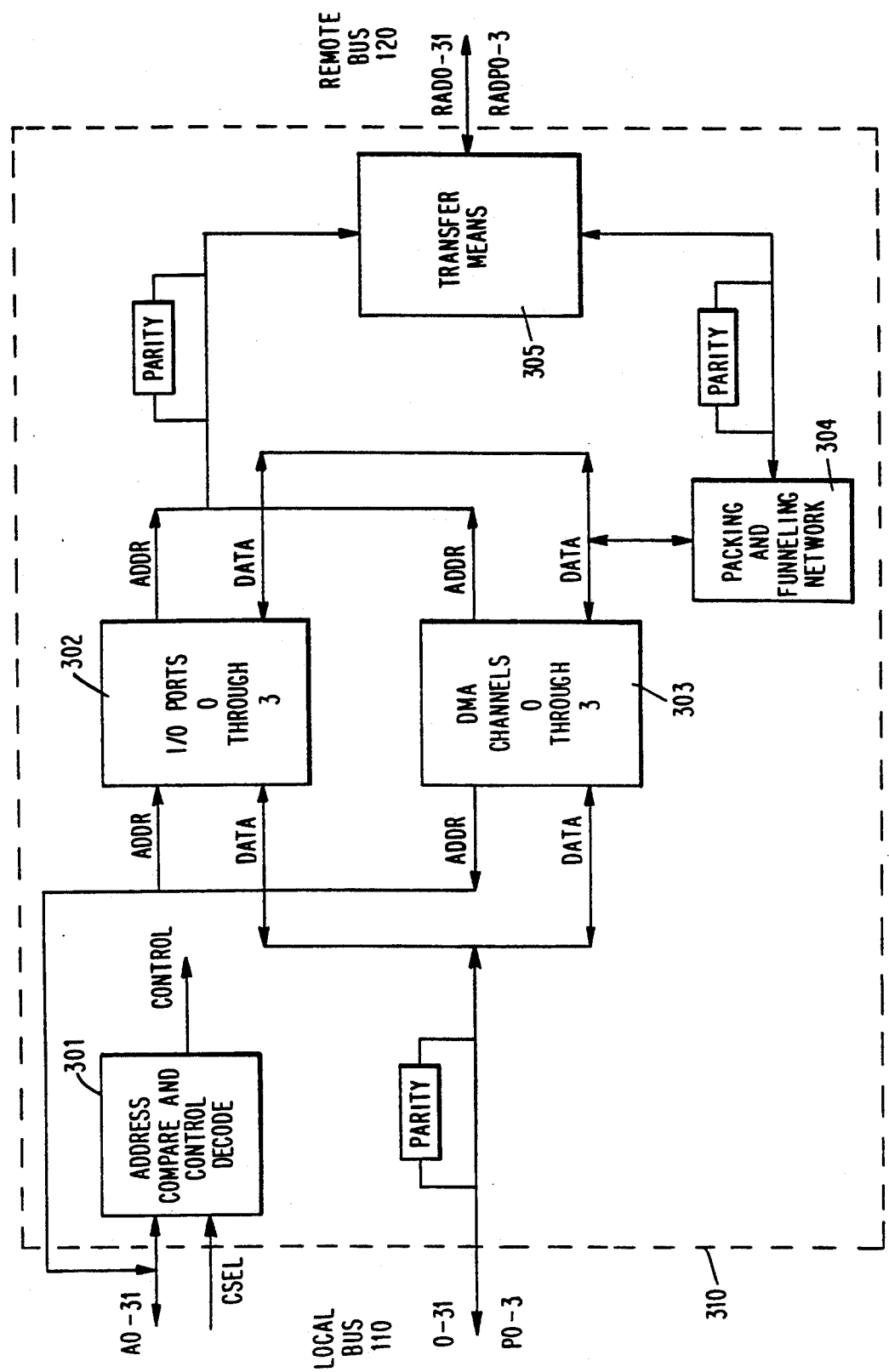
FIG. 3 is a functional block diagram of a DTC, built in accordance with the teachings of the invention, having 4 I/O ports and 4 DMA channels.

Reference should now be made to FIG. 3 which is a functional block diagram of a DTC, built in accordance with the teachings of the invention, having 4 I/O ports and 4 DMA channels. The description of FIG. 3 will provide an overview of the DTC operation.

The DTC is outlined by a dashed line and referenced by reference numeral 310, corresponding to block 104 in FIG. 1.

Only a subset of the previously described DTC input and output signals, with an indication of possible signal direction indicated by arrowheads, is shown in FIG. 3. In particular, the A0-A31, *CSEL, D0-D31, DP0-DP3, RAD0-RAD31 and RADP0-RADP3 signals are shown coupled to DTC 310. Only these signals are necessary in order to explain the overview of how data and address information is channelled through DTC 310.

It will be understood by those skilled in the art that DTC 310 has internal registers (not shown in FIG. 3) which are used for holding and controlling various signals, counters, inputs, outputs, etc., flowing into, out of or through DTC 310. The particular register structure used to implement DTC 310 is instructive although not the only structure for operating and controlling an I/O controller. Accordingly, a general outline of the internal DTC registers used in the preferred embodiment of the invention, along with a brief description of the function of each of these registers, will be set forth for the sake of completeness. Also, whenever a particular internal register of significance is useful in explaining the operation of DTC 310 it will be referenced with particularity.

It should be noted that the internal DTC registers can be addressed, according to the preferred embodiment of the invention, via Address Bus 111. For example, prior to using the I/O ports, a range of addresses may be loaded into internal DTC registers to set up access windows into which (or from which) data is written and retrieved from the ports. This initialization function may be performed, according to the preferred embodiment of the invention, by address compare and control decoder means 301 of FIG. 3, which may be implemented by well known hardware and/or software techniques for loading registers not constituting a part of the invention. In addition to setting up port windows, the *CSEL input and A0-A31 inputs to block 301 and the control output from block 301 (to DTC 310 internal registers) are used, according to the preferred embodiment, to configure DTC 310 to recognize Local Bus requests either as a result of an address decode or as the result of *CSEL being active (LOW).

FIG. 3, in addition to means 301, depicts I/O ports 0-3 (means 302), DMA channels 0-3 (means 303), packing and funneling network (means 304), multiplexing and transceiver devices (transfer means 305), and various parity checking means. Also shown In FIG. 3 are A0-A31 (Address Bus 111), D0-D31 (Data Bus 112) and the *CSEL input, all on the Local Bus side of DTC 310. On the Remote Bus side of DTC 310 the RAD-0-RAD31 and the RADP0-RADP3 interface is shown.

As indicated hereinabove, means 301 my be utilized to perform the aforesaid window creation, i.e., open up I/O ports, etc. According to the preferred embodiment of the invention, these windows have power of two address ranges starting on a Local Bus word boundry.

The 4 I/O ports in means 302 are addressed via embodiment's RISC processor. The 4 DMA channels in means 303 are preprogrammed in a manner well known for utilizing DMA channels, to determine a start address for data transfer Typically, sequential addressing is utilized for DMA transfers, although the invention features limited nonsequential transfers, e.g., by 2's, 4's, etc. based on the use of internal DTC counters which increment a base address register. Again, means 301 may be used to initialize the registers and counters in means 302 and 303.

If during operation of the DTC an address presented on A0-A31 is recognized by the I/O controller as being within an I/O port window, then the address is translated within means 302 into the Remote Bus address space. If the address is not recognized, no translation occurs.

Address translation for the I/O ports is performed, according to the preferred embodiment of the invention, by replacing the address input to the DTC with a corresponding Remote Bus address within a range of Remote Bus address loaded into the I/O port registers during initialization. These Remote Bus addresses correspond 1 to 1 with the Local Bus Address window set up for a given port and also correspond to discrete device addresses for devices tied to the Remote Bus.

DTC 310 then performs the Remote Bus access using the translated address, i.e., performs the appropriate read or write in correspondence with the execution of RISC processor load and store instructions, respectively.

With respect to DMA channel means 303, each channel determines the address from which (or to which) data is to be transferred. Means 303 is preprogrammed to perform this determination and operates, independent of the RISC processor except for being initialized. As indicated hereinbefore, the DMA channels have, according to the preferred embodiment of the invention, the flexibility to perform limited non-sequential transfers.

FIG. 3 goes on to show multiplexing and transceiver circuits in means 305 to indicate that addresses and data are interleaved when output to or received from the Remote Bus via the transceivers and the RAD-0-RAD31 (and 4 parity bit) interface.

It should also be noted with reference to FIG. 3 that all data to and from means 305 and either an I/O port or DMA channel, must pass through pack/funneling network means 304. If, for example, bits D8-D15 are to be taken from the Data Bus portion of the Local Bus and be transferred onto the Remote Bus (a write), pack/funneling network means 304, according to the preferred embodiment of the invention to be described in greater detail hereinafter, "funnels" 4 copies of the 8 bits juxtaposed in one word to the Remote Bus. For half word transfers from the Local Bus to the Remote Bus, means 304 creates a 32 bit word with 2 sets of the appropriate 16 bits juxtaposed for output by the DTC to the Remote Bus.

For reads, data normally comes back from the Remote Bus late in the same memory cycle as the read is being executed. Normally the data (8, 16 or 32 bits) is right adjusted and "packed" by means 304 into a 32 bit word since all transfers to the Local Bus are 32 bits wide. Again, the details of the operation of means 304 will be set forth hereinafter.

Having completed the description of the overview of DTC 310, a generalized internal register description will now be set forth together with a description of the data formats supported by the novel DTC. This will enable those skilled in the art to understand how to make and use the invention. Also, a specific explanation of the I/O port and DMA functions implemented will be set forth in the context of using the invention to support a RISC system.

Most software interactions with DTC 310 occur via accesses to the internal DTC registers. These registers are read and written by wordlength (i.e. 32-bit) accesses on the Local Bus. None are directly accessible via the Remote Bus.

The registers are grouped into 4 classes:
1. Global Control Registers
2. DMA Channel Registers
3. I/O Port Registers
4. Queue Registers A RISC processor on the Local Bus accesses DTC registers using load and store instructions. Each register is assigned a unique address in either the data-memory or I/O address space of the RISC system. This address is specified, according to the preferred embodiment of the invention, in terms of a word offset from a base address. The base address is common to all DTC registers. A Chip Select Mapping Register in the DTC specifies the base address for DTC registers, and specifies whether this address is in the data-memory or I/O address space of the RISC system to which the DTC, in accordance with the example being used to illustrate DTC operation, is attached.

Alternatively, as indicated hereinbefore, the DTC can be configured, via means 301 of FIG. 3, to ignore the Local Bus, and respond to any register access for which the *CSEL input is active. In this case, a particular register is selected only by the offset portion of the address.

The Global Control Registers, 5 of which are defined for the preferred embodiment of the invention, contain control and status information for the DTC as a whole. The 5 defined registers are a Global Mode, Global Status, Local Burst/Dwell, Remote Burst/Dwell and Chip Select Map Register.

The Global Mode Register may be used to configure DTC options which are not port or channel specific.

Bits have been reserved, in accordance with the preferred embodiment of the invention, in the Global Control register to enable or disable DMA channels and I/O ports, to determine whether Remote Bus operations are synchronous or asynchronous to RCLK, to specify the address space (data memory or I/O address space on the Local Bus) for the DTC's internal registers, to determine whether the DTC is to use the *CSEL input or the Chip Select Mapping Register to detect accesses to internal registers, to determine the relative priorities for DMA channel request (these may be fixed or rotated), to specify the byte order (referred to hereinafter as "LBO", or Local Byte Order) for all Local Bus transfers (i.e., whether bytes within words and half words are to be addressed left to right or vice-versa), to enable or disable parity checking and to enable or disable DTC interrupts.

It should be noted that the LBO information is used, according to the preferred embodiment of the invention, to determine ordering for packing and funneling operations, and is used in conjunction with the Remote Byte Order ("RBO") bits in the Channel Mode and Port Mode registers, to be described hereinafter, to determine whether or not byte swapping is performed on a local-to-remote or remote-to-local transfer.

The information stored in the Global Status register, in accordance with the preferred embodiment of the invention, is as follows:

A Protection Violation bit indicates whether a protection violation occurred on an internal-register access. If a User-mode access (as indicated by SUP/*US) is attempted to an internal DTC register, the DTC responds with *DERR. This bit is set to indicate the reason for the *DERR response.

A Data-Width Exception bit indicates a data width exception on an internal-register access. The DTC responds to an attempted byte or half-word access to an internal register with *DERR. This bit is set to indicate the reason for the *DERR response.

An Addressing Error indicates an attempt to access an unimplemented DTC register. When such an access is attempted, the DTC responds with *DERR. This bit is set to indicate the reason for the *DERR response.

Port Trap bits are used to indicate which of the I/O ports generated a *DERR response. If a port trap bit is set the Port Status Register, to be described hereinafter, of the indicated port gives the reason for the *DERR response.

Channel Interrupt Pending bits are used to reflect the interrupt status of DMA Channels When one of these bits is set an interrupt condition is pending on the channel associated with the bit. The reason for the condition can be determined by examining the appropriate Channel Status Register (one for each channel, to be described hereinafter).

According to the preferred embodiment of the invention, bits are also reserved in the Global Status Register to indicate the device release level for the DTC.

The Local Burst/Dwell Register exercises global control of Local Bus utilization. According to the preferred embodiment of the invention, this register contains a Local Burst Count Field which, in order to support Burst Mode operations described in the incorporated copending application, specifies the maximum number of contiguous Local Bus clock cycles that the DTC can use for data transfer. If the limitation is exceeded on a transfer, the DTC completes any in-progress access before relinquishing the Local Bus. A Local Dwell Count field specifies the number of Local Bus clock cycles for which the DTC must be idle on the Local Bus after a successful Local Bus transfer.

The Remote Bust/Dwell Register exercises global control of DTC Remote Bus utilization. A Remote Burst Count field specifies the maximum number of contiguous Remote Bus clock cycles tha the DTC can use for data transfer. If the limitation is exceeded on a transfer, the DTC completes any in-progress access before relinquishing the Remote Bus. A Remote Dwell Count field specifies the number of Remote Bus clock cycles for which the DTC must be idle on the Remote Bus after a successful Remote Bus transfer.

The last Global Control register presently defined is a Chip Select Mapping Register which controls the addressing of DTC internal registers in certain instances, as indicated hereinbefore with reference to the Global Mode Register. The Global Control register also has a Chip Select Address field which specifies the base address for DTC internal registers.

The DMA Channel Registers contain control and status information for the four DMA channels called for in the preferred embodiment of the DTC. There are four identical sets of registers, one set per DMA channel. Eleven registers have been defined for each channel. Each will be described immediately hereinafter.

A Channel Mode Register controls DMA channel transfers. It must be utilized before a DMA transfer can be performed.

This register, according to the preferred embodiment of the invention, contains: a Remote Wait Count field which specifies the number of cycles (above one) that *DSTB must remain active during a Remote Bus transfer; and a Remote Recovery Count field which specifies the number of cycles that a channel must be idle after a Remote Bus transfer has completed. The value of this field gives the minimum number of cycles required between the end of a data cycle and the beginning of the next data cycle for the DMA channel; a Data Location field which specifies the location of byte and half-word data on the Remote Bus, according the following table:

| Field Value | Location |
|---|---|
| 00 | By Address |
| 01 | Fixed High |
| 10 | Fixed Low |
| 11 | Fixed Low/Bytes by Address; | an Interrupt Enable bit; a Local Alarm Enable bit which causes the DMA channel to generate an alarm interrupt when set and when the Local Byte Count Register (to be described hereinafter) exceeds the value in the Local Alarm Count Register (also to be described hereinafter); a Remote Alarm Enable bit which causes the DMA channel to generate an alarm when set and when the value in the Remote Byte Counter Register exceeds the value in the Remote Alarm Count Register (both the Remote Byte Count and Remote Alarm registers to be described hereinafter); and a Local Transfer Disable bit. This bit is 0 when transfers to or from the Local Bus memory are performed. When the bit is 1, transfers to or from the Local Bus memory are disabled, and DMA queues are directly read and written by the Local Bus processor; a DMA Request Response Mode field where the bits specify the behavior of the DMA channel for an assertion of the following corresponding *DRQ0-*DRQ3 input:

| FIELD VALUE | RESPONSE MODE |
|---|---|
| 00 | Ignore DMA Request |
| 01 | Single Transfer |
| 10 | Demand Transfer |
| 11 | Reserved; |

A block Mode bit which determines whether block-mode transfers are performed on the Remote Bus; a Remote Address Direction bit which specifies whether the Remote Address Register is incremented or decremented after a DMA transfer on the remote bus; a Remote Address Hold bit which when 0 allows the Remote Addresses Register to be incremented or decremented according to the Remote Address Direction bit, and which holds the Remote Address Register constant when set; a Queue Pattern bit which selects whether the DMA queue associated with the channel is used as a data buffer or a pattern source; and a Transfer Direction bit which controls the direction of DMA channel transfers. When this bit is 0, local-to-remote transfers are performed. When this bit is 1, remote-to-local transfers are performed; a Remote Address Space bit which specifies the address space of the remote transfer. If the bit is 0, transfers are directed to the memory address space (IO/*MEM LOW). If it is 1, transfers are directed the I/O address space (IO/*MEM HIGH); a Data Size Acknowledge Disable bit which enables or disables the DMA channel response to the DSACK0-DSACK1 inputs; a Remote Byte Order bit which specifies the Remote Bus byte order for the DMA channel. When the RBO bit is 0, bytes and half-words are sequentailly addressed from left-to-right within half-words and words. When it is 1, they are sequentially addressed right-to-left; and finally a Data Width field where the bits specify the Remote Bus data width for the DMA channel, as follows:

| FIELD VALUE | DATA WIDTH |
|---|---|
| 00 | 32 bits |
| 01 | 8 bits |
| 10 | 16 bits |
| 11 | Invalid |

A Channel Status Register holds the current status of the channel. It is updated by the DTC when a DMA transfer is terminated or an exception occurs.

This register, according to the preferred embodiment of the invention, contains a parity error bit which, if checking is enabled by the Parity Check Enable bit of the Global Mode Register, is set whenever a parity error is detected during a DMA transfer; a Remote Bus Error bit which is set if *RBERR is asserted during a Remote Bus DMA transfer; a Data Width Exception bit which is set if the DSACK0-DSACK1 response to a Remote Bus DMA transfer indicates that the Remote Bus device or memory cannot handle a transfer of the requested width; an Address Conflict bit which is set if an address conflict is detected during a DMA transfer (i.e. a transfer to DTC internal register or I/O port); a Local Bus Error bit which is set if *DERR is asserted during a Local Bus DMA transfer; an End-Of-Process bit which is set if the *EOP input is asserted during a Remote Bus DMA transfer; a Channel Terminated bit which specifies completion of the DMA transfer; a Local Alarm Count Reached bit which is set if the value in the Local Byte Count Register exceeds the value in the Local Alarm Count Register, if enabled by the Local Alarm Enable bit of the Channel Mode Register; a Remote Alarm Count Reached bit which is set if the value in the Remote Byte Count Register exceeds the value in the Remote Alarm Count Register, if enabled by the Remote Alarm Enable bit of the Channel Mode Register; and a Data Size Acknowledge field which holds the value of the most recent DSACK0-DSACK1 response for the DMA channel. If a data-width exception occurs, this field indicates the Remote Bus response which caused the exception, a Channel Active bit which is 0, when the channel is inactive, and no DMA transfers are performed. If the bit is 1, the channel is active. This bit is set to 0 by the DTC when the termination count is reached or an exception occurs. It may be set to 0 by the Local Bus processor to temporarily suspend transfers on the DMA channel; and finally, a Channel Reset bit. This bit is a "write-only" bit which has the value 0 when read. When a 1 is stored into this bit by the Local Bus processor, the DMA channel is reset, the Local Byte Count Register, the Remote Byte Count Register, and the Queue Head and Queue Tail fields of the Queue Status Register (to be described hereinafter) are set in zero.

A Local Address Register holds the address of a current or pending Local Bus transfer. It is incremented by 4 (bytes) after each successful Local Bus transfer.

A Remote Address Register holds the address of any current or pending Remote Bus transfer. If the Remote Address Hold field of the Channel Mode Register is 0, it is incremented or decremented after each successful Remote Bus transfer according to the Remote Address Direction bit in the Channel Mode Register. The increment or decrement amount is specified by the Data Width field in the Channel Mode Register:

| FIELD VALUE | INCREMENT/DECREMENT AMOUNT |
|---|---|
| 00 | 4 |
| 01 | 1 |
| 10 | 2 |
| 11 | undefined |

A Local Byte Count Register holds the number of bytes successfully transferred on the Local Bus. When this count matches or exceeds the value in the Terminate Count Register (to be described hereinafter), the DMA channel Local Bus transfers are complete. After each successful transfer, the value in the Local Byte Count Register is incremented by 4 (bytes).

A Local Alarm Count Register specifies the number of bytes to be transferred on the Local Bus before an alarm interrupt is generated (if enabled).

A Remote Byte Count Register holds the number of bytes successfully transferred on the Remote Bus. When this count meets of exceeds the value in the Terminate Count Register, the DMA channel Remote Bus transfers are complete. After each successful transfer, the value in the Remote Byte Count Register is incremented by the amount determined by the Data Width field in the Channel Mode Register:

| FIELD VALUE | INCREMENT/DECREMENT AMOUNT |
|---|---|
| 00 | 4 |

| FIELD VALUE | INCREMENT/DECREMENT AMOUNT |
|---|---|
| 01 | 1 |
| 10 | 2 |
| 11 | undefined |

A Remote Alarm Count Register specifies the number of bytes to be transferred on the Remote Bus before an alarm interrupt is generated (if enabled).

A Terminate Count Register specifies the number of bytes to be transferred by the DMA channel.

A Pack/Funnel Register buffers data being transferred to or from the Remote Bus. It serves as a destination or source of data during packing and funneling operations on the DMA channel.

The final DMA channel register defined is a Queue Status Register which holds word-address pointers for the current head and tail of the DMA queue.

According to the preferred embodiment of the invention, this register contains a Queue Head field which contains the address of the next queue register available for de-queueing. The value of the filed is incremented by 1 after each word is de-queued and a Queue Tail field which contains the address of the next queue register available for en-queuing. The value of the field is incremented by 1 after each word in en-queued.

The next set of internal registers to be described are the I/O port registers. These registers contain control and status information for the four I/O ports in the DTC. There are four identical sets of registers, one set per I/O port. The set includes 6 registers, a Port Mode Register, a Port Status Register, a Local Base Address Register, a Remote Base Address Register, a Local Port Address Register and a Port Pack/Funnel Register.

The Port Mode Register controls remote programmed I/O transfers (to be described hereinafter). It must be initialized before a remote programmed I/O transfer is performed. The Port Mode Register, according to the preferred embodiment of the invention, contains a Remote Wait Count Field. When the DTC generates Remote Bus timing for I/O port transfers, the field specifies the number of cycles (above one) that *DSTB must remain active during a Remote Bus transfer; and a Remote Recovery Count field. When the DTC generates Remote Bus timing for I/O port transfers, this field specifies the number of cycles that an I/O port must be idle after a Remote Bus transfer has completed. The value of this field gives the minimum number of cycles required between the end of a data cycle and the beginning of the next data cycle for the I/O port; a Data Location filed which specifies the location of byte and half-word data on the Remote Bus, according to the following table:

| FIELD VALUE | LOCATION |
|---|---|
| 00 | By Address |
| 01 | Fixed High |
| 10 | Fixed Low |
| 11 | Fixed Low/Bytes by Address | a Window Size field which encodes the size of the I/O port address space, by specifying the logarithm (base 2) of the port size in bytes. For example, if the value of the window size field is 8, the port size is 256 bytes. Similarly, if the window size field is 17, the port size is 128K bytes; A Supervisor Access Only bit which when set only allows Supervisor mode accesses (as indicated by the SUP/*US signal) via the I/O port. When this bit is 0, either User-mode or Supervisor-mode accesses are allowed; and an overlapped I/O bit which determines whether port accesses are direct or de-coupled. If the bit is 0, port transactions are direct; the Remote Bus access must complete before the Local Bus access can complete. If the bit is 1, port accesses are de-coupled, and a Local Bus access can complete before the Remote Bus access is performed. This bit is set to enable an I/O port to perform read-ahead or write-behind operations and provide the parallelism with respect to port transactions referred to hereinbefore; a Local Address Space bit which specifies the address space of the I/O port on the Local Bus. If the bit is 0, the I/O port in the data-memory address space of the Local Bus. If the bit is 1, the I/O port is in the I/O address space of the Local Bus; a Remote Address Space bit which specifies the address space of the remote transfer. If the bit is 0, transfers are directed to the memory address space (IO/*MEM LOW). If it is 1, transfers are directed to the I/O address space (IO/*MEM HIGH; a Data Size Acknowledge Disable bit which enables or disables the I/O port response to the DSACK0-DSACK1 inputs; a Remote Byte Order bit which specifies the Remote Bus byte order for the I/O port. When the bit is 0, bytes and half-words are sequentially addressed from left-to-right within half-words and words. When it is 1, they are sequentially addressed right-to-left; and finally, a Data Width field which specifies the Remote Bus data width for the I/O port, as follows:

| FIELD VALUE | DATA WIDTH |
|---|---|
| 00 | 32 bits |
| 01 | 8 bits |
| 10 | 16 bits |
| 11 | Invalid |

The Port Status Register holds the current status of the I/O port. It is updated by the DTC when an I/O port transfer encounters an exception and responds with *DERR. According to the preferred embodiment of the invention, this register includes a Protection Violation bit which indicates whether a protection violation occurred on the I/O port. If a User-mode access (as indicated by SUP/*US) is attempted to an I/O port for which the Supervisor Access only bit in the Port Mode Register is 1, the DTC responds with *DERR. The bit is set to indicate the reason for the *DERR response; a Parity Error bit. If parity checking is enabled by the Parity Check Enable bit of the Global Mode Register, the parity error bit is set whenever a parity error is detected during an I/O port transfer. Parity inputs for signals which are "don't cares" (because of byte or half-word data widths) are ignored. Parity is checked only for reads on the Remote Bus. There is no parity checking on data for writes via the I/O port; a Remote Bus Error which is set if *RBERR is asserted during an I/O port transfer; a Data-Width Exception bit which is set if the DSACK0-DSACK1 response to a Remote Bus I/O port transfer indicates that the Remote Bus device or memory cannot hadle a transfer of the requested width; and finally a Data Size Acknowledge field which holds the value of the most recent DSACK-0-DSACK1 response for the I/O port. If a data-width exception occurs, this field indicates the Remote Bus response which caused the exception.

The Local Base Address Register specifies the Local Bus base address of the I/O port. The address space for this port is specified by the Local Address Space bit of the Port Mode Register.

The Remote Base Address Register specifies the Remote Bus base address of the I/O port. The address space for this port is specified by the Remote Address Space bit of the Port Mode Register.

The Local Port Address Register holds the Local Bus for the current I/O port access (which may be a read-ahead or write-behind). This address may be used by software to restart an access encountering an exception.

The Pack/Funnel Register buffers data being transferred to or from the Remote Bus. It serves as a destination or source of data during packing and funneling operations on the I/O port. For read-ahead and write-behind, the Pack/Funnel Register serves as a data buffer. For a write via the I/O port which encounters an exception, the Pack/Funnel Register holds data that may be used by software to restart the write.

The final set of internal registers are the Queue Registers. The Queue Registers buffer data for DMA transfers. These registers may be accessed by the Local Bus processor to directly read or write the contents of the queue. Queue operation for each channel will be described in detail hereinafter.

This completes the detailed description of the function of the internal DTC registers.

As far as register initialization is concerned, after the DTC is reset, its registers have indeterminate values, except that the Global Mode Register is set to zero. This disables all I/O ports and DMA channels, disables interrupts, and enables the *CSEL input.

According to the preferred embodiment of the invention, operating in the context of a RISC system, an initialization routine executing on the RISC processor is responsible for initializing the DTC registers as required by the system. The design of a processor driven initialization routine is well within the knowledge of those skilled in the art and accordingly the initialization routine does not constitute a part of the invention.

It should be noted that until the Chip Select Mapping Register has been properly initialized, the internal DTC registers can be accessed only by asserting the *CSEL input.

For this purpose, *CSEL may be asserted in any system-dependent manner, such as by connecting one of the A31–A11 signals directly to *CSEL (note that this effectively implements a bit-significant address decode for the purpose of initializing DTC registers). Once the Chip Select Mapping Register has been properly initialized, the DTC can be made insensitive to *CSEL, and registers are then accessed using the normal addresses defined by the system.

Next, the data formats supported by the novel DTC, and how they are handled, will be set forth in detail.

As indicated hereinbefore, the preferred embodiment of the DTC supports word (32 bit), half-word (16 bit), and byte (8 bit) transfers on the Remote Bus. Data transfers on the Local Bus are word oriented, although a Local Bus access directed to an I/O port may be half-word of byte access.

There are two defacto standards for addressing bytes and half-words within half-words and words. The DTC supports peripheral devices of either standard, using configuration options which are described hereinafter.

Additionally, the DTC incorporates provisions for converting transfers of a given data width on the Remote Bus to and from transfers of a larger data width on the Local Bus. For any transfer between the Remote and Local Buses, the width of data on the Local Bus must be greater than or equal to the width of data on the Remote Bus. Data-width conversions are performed by the aforementioned packing and funneling means, shown as 304 in FIG. 3.

Focusing on data widths, the DTC's DMA queues always store word length data, and all transfers between the Local Bus and DMA queues are 32 bit transfers. On the other hand, transfers between the Remote Bus and DMA queues may be byte, half-word, or word transfers; byte and half-word transfers involve the packing and funneling operations described in detail hereinafter.

Transfers to and from internal DTC registers are always word-length tranfers. Byte and half-word accesses to DTC registers are not supported, and the DTC responds to an attempted byte or half-word access of an internal register with a *DERR indication. As indicated hereinbefore, a data width exception bit in the Global Status Register is set by the DTC to indicate the cause of the exception.

The DTC allows a byte, word, or half-word access via an I/O port. If the requested data width is larger than the data width indicated by the appropriate Port Mode Register, the DTC handles the size mismatch using the packing and funneling operations described hereinafter.

Focusing first on the Local Bus interface with the DTC, when the DTC is a Local Bus slave, the data width of the associated data transfer is indicated by the OPT0–OPT1 signals. These signals reflect the OPT field of the RISC processor load or store instruction, defined in the incorporated copending application, performing the transfer. The encoding of the OPT0–OPT1 signals has been set forth hereinbefore.

If the DTC cannot support an access of a given width (possibly because the Remote Bus cannot support the access), it responds to the access with a *DERR indication. The data width exception bit of either the Global Status Register or the Port Status Register, as appropriate, is set to indicate the cause of the exception.

With respect to Remote Bus data widths for a DMA transfer on the Remote Bus, the data width of the transfer is specified by the Data Width field of the associated Channel Mode Register (described hereinbefore).

For an I/O port transfer, the data width of the transfer according to the preferred embodiment of the invention, is specified by a combination of the data width field of the associated Port Mode Register and the OPT0–OPT1 inputs on the Local Bus.

The data width for a Remote Bus transfer is reflected on the DSIZE0–DSIZE1 outputs when the transfer occurs. If the requested transfer is not supported by the Remote Bus (because the device or memory on the Remote Bus is not sufficiently wide), the Remote Bus responds DSACK0–DSACK1 response indicating the actual supported data width. This causes a data width exception. (The *RBERR signal may also be used to create an exception, but will not isolate the cause.

If a DMA transfer encounters a data width exception, the transfer is cancelled, and *INTR is asserted if interrupts are enabled.

If an I/O access encounters a data width exception, the DTC responds on the Local Bus with a *DERR indication. In the case of read-ahead or write-behind,

*DERR signals that an exception occurred on the most recent access via the corresponding I/O port.

When an exception is caused by a DSACK0-DSACK1 response, the state of the DSACK0-DSACK1 inputs associated with the exception is stored in the Data Size Acknowledge field of the Channel Status or Port Status Register associated with the transfer (the DSACK0-DSACK1 response is stored for any exception). This can allow the interrupt or trap handler to retry the access with the proper data width.

It is possible for a Remote Bus device or memory to give a DASCK0-DSACK1 response indicating that it supports a wider data width than is requested. In this case, the DTC still treats the access as one with the requested width.

Turning to data alignment considerations. Addresses on both the Local and Remote Buses are byte addresses, in that they are sufficient to select a byte in a device or memory attached to either bus. When a half-word or word is accessed, the corresponding address is normally aligned, in that it points to the first byte in the half-word or word. An aligned half-word address has 0 in the least significant bit, and an aligned word address has 00 in the two least significant bits.

The DTC forces alignment for all half-word and word accesses by interpreting the one or two least significant bits of an address as 0 (as appropriate) regardless of the actual values. This is in contrast to some systems, which interpret such accesses as unaligned accesses requiring multiple data accesses, with shifting, alignment, and concatenation. If such accesses must be supported, they must by intercepted by the Unaligned Access Trap in the RISC system to which the DTC described herein is attached.

In cases where a byte is accessed as part of a half-word or word, or where a half-word is accessed as part of a word, the location of the byte or half-word within the half-word or word is determined by one of two established conventions. These conventions relate the location of the byte or half-word to its corresponding address, and are shown in FIG. 4.

Figure 4A:
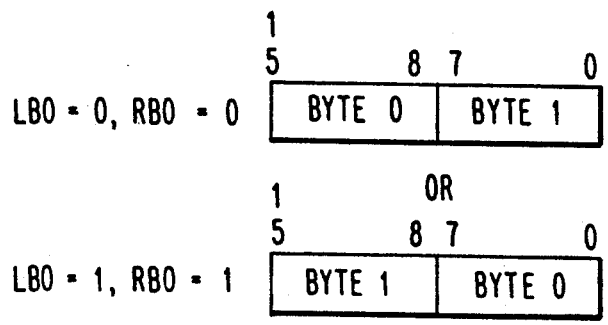
FIG. 4 depicts the established conventions for the location of bytes and half-words within half-words and words, which are supported by the novel DTC taught herein.
Figure 4B:
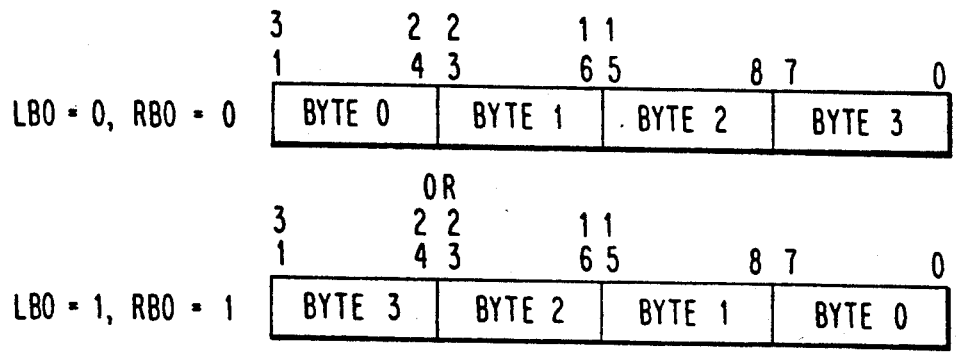
Figure 4C:
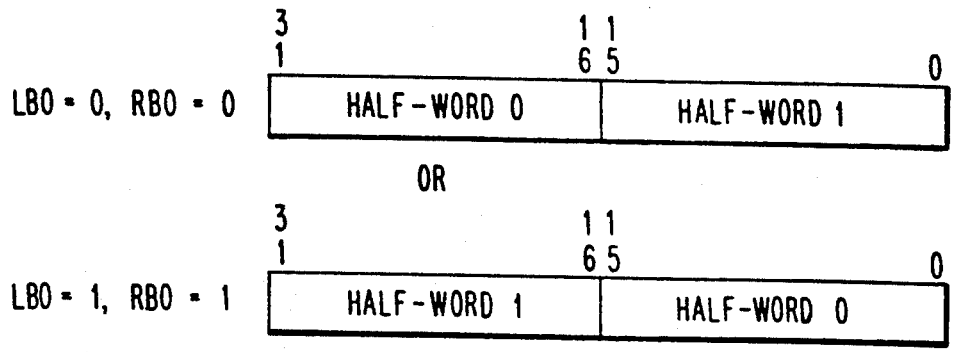

In FIG. 4 the following numbering conventions are used:
1. Bytes within half-words are numbered according to the least significant bit of the corresponding address.
2. Bytes within words are numbered according to the two least significant bits of the corresponding address.
3. Half-words are numbered according to the next-to-least significant bit of the corresponding address.

In a RISC system, either of the conventions shown in in FIG. 4 may apply on the Local Bus, and either or both may apply on the Remote Bus. Because of this, the DTC supports both conventions, with conversions between them.

The Local Byte Order ("LBO") bit of the Global Mode Register specifies which of the ordering conventions applies on the Local Bus, as shown in FIG. 4. If the LBO bit is 0, bytes and half-words are sequentially addressed left-to-right within half-words and words. If the LBO bit is 1, they are sequentially addressed right-to-left. Note that only one convention is possible for all transfers on the Local Bus.

The Remote Byte Order ("RBO") bit of the Channel Mode or Port Mode registers specifies which of the ordering conventions applies on the Remote Bus, on a channel by channel or port by port basis. If the RBO bit is 0, bytes and half-words are sequentially addressed left to right within half-words and words. If the RBO bit is 1, they are sequentially addressed right to left.

In general, the LBO bit controls byte and half-word selection during packing and funneling operations. If the LBO bit is 0, packing and funneling proceed left to right for sequentially increasing addresses. If the LBO bit is 1, packing and funneling proceed right to left for sequentially increasing addresses. Note that the order is reversed for sequentially decreasing addresses.

The RBO bit controls the locating of data on the Remote Bus, for those cases where byte and half-word location depend on the address. In addition, when a DMA channel or I/O port is involved in a transfer, the RBO bit for the associated Channel Mode or Port Mode register is compared to the LBO bit. If the selected RBO bit does not match the LBO bit, and the transferred data is wider than a byte, then the bytes within the half-word or word are swapped to convert between the two addressing conventions. This swapping is portrayed graphically in FIG. 5.

Figure 5A:
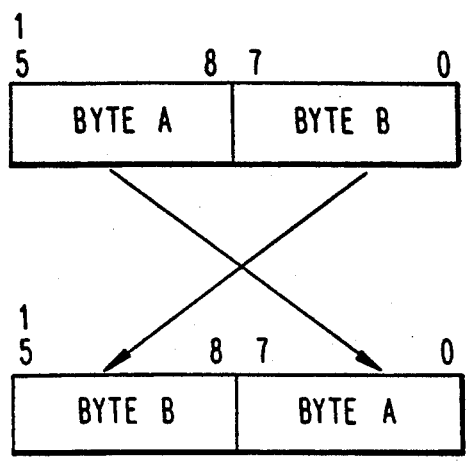
FIG. 5 illustrates the swapping of bytes within half-words and words when the DTC is used to convert between the addressing conventions depicted in FIG. 4.
Figure 5B:
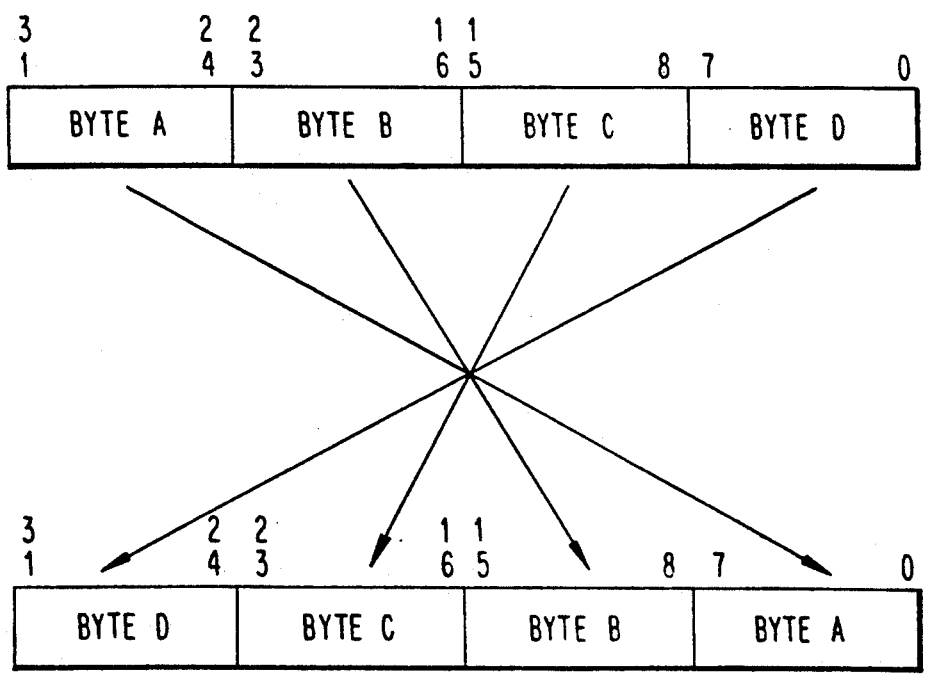

In FIG. 5, bytes are labelled with letters (instead of numbers) to emphasize that swapping converts from any addressing convention to the other.

The manner in which packing and funneling operations are supported by the DTC will now be described.

With respect to packing, on a remote to local transfer, the DTC can convert a number of byte or half-word transfers on the Remote Bus into a smaller number of half-word or word transfers on the Local Bus. This is accomplished by packing bytes or half-words into half-words or words. It should be recalled that bytes can be packed into a half-word only for an I/O port access.

Each DTC DMA channel and I/O port has, as previously indicated, an associated 32-bit Pack/Funnel Register. This register supports the packing operation by collecting bytes or half-words until the required amount of data has been collected (the required data width is normally a word, but may be a half-word in the case of the I/O port access). When the data in the Pack/Funnel Register reaches the required width, it is transferred from the Pack/Funnel Register to the appropriate DMA queue (for a DMA channel) or to the Local Bus (for an I/O port). Once data has been removed from the Pack/Funnel Register, further packing operations may proceed.

Local and Remote Bus transfers during packing operations occur as set forth in the following table:

| Local Bus Data Width | Remote Bus Data Width | Number of Remote Bus Transfers |
|---|---|---|
| 32 bits | 32 bits | 1 |
| 32 bits | 16 bits | 2 |
| 32 bits | 8 bits | 4 |
| 16 bits | 16 bits | 1 (I/O port only) |
| 16 bits | 8 bits | 2 (I/O port only) |
| 8 bits | 8 bits | 1 (I/O port only) |

It should be noted that all data transferred from the Remote Bus to the Local Bus is buffered in the appropriate Pack/Funnel Register, even in cases where the data width on the Remote Bus matches the data width on the Local Bus.

In exceptional cases, the packing operation may be cancelled before the required data width is obtained. These cases arise when there is an exception during a transfer (for example, a parity error), or when the Remote Bus transfer terminates before the packing operation has created a word (e.g. when an odd number of bytes are transferred on a DMA channel). If the packing operation cannot create a data unit of the required width, the remainder of the half-word or word is, according to the preferred embodiment of the invention, padded with zeros.

With respect to funneling, for a local to remote transfer, the DTC can convert a number of word or half-word transfers on the Local Bus into a larger number of half-word or byte transfers on the Remote Bus. This is accomplished by funneling data within a word or half-word into a sequence of half-word or byte transfers. It should be noted that a half-word is funneled into bytes only for an I/O port access).

The Pack/Funnel Register accepts data from a DMA queue (for a DMA channel) or from the Local Bus (for an I/O port), and buffers it during the funnel operation. Funneling extracts half-words or bytes one at a time form the Pack/Funnel Register, and transfers them individually on the Remote Bus. When all data in the Pack/Funnel Register have been transferred, the Pack/Funnel Register may be written with more data to be transferred.

Local and Remote Bus transfers during funneling operations occur in the same manner as during packing, with the table of data widths and number of transfers as set forth hereinbefore.

It should also be noted that all data transferred from the Local Bus to the Remote Bus is buffered in the appropriate Pack/Funnel Register, even in cases where the data width on the Local Bus matches the data width on the Remote Bus.

In exceptional cases, the funneling operation may be cancelled before the data in the Pack/Funnel Register have been exhausted. These cases arise when there is an error during a transfer (for example, a parity error), or when the Remote Bus transfer terminates before the funneling operation has transferred all half-words or words from the Pack/Funnel Register (e.g. when an odd number of gytes are transferred on a DMA channal). In each of these cases, any untransferred data in the Pack/Funnel Register is, according to the preferred embodiment of the invention, ignored.

Having described how the DTC handles data and the formats supported, the description of the DTC will now turn to it support of programmed I/O.

The term "programmed I/O" as used herein describes any DTC access or data transfer which is the direct result of the execution of a load or store instruction by the RISC processor. This term should not be confused with an access to the RISC system I/O address space, because the DTC supports programmed I/O in either in the RISC system's data memory or I/O address space.

The DTC supports two types of programmed I/O; internal and remote. Internal programmed I/O is used to access DTC internal registers. Remote I/O is used to access data on the Remote Bus in a manner which is coupled to program execution (in contrast to DMA, which is normally decoupled).

As indicated hereinbefore, accesses to internal DTC registers are controlled by the Chip Select Mapping Register. This register specifies the base address for internal registers and whether this address is in the data memory or I/O address space of the RISC system. It also enables and disables the *CSEL input; the base address is irrelevant whenever *CSEL is enabled.

If *CSEL is enabled, the DTC responds to any internal access for which the *CSEL input is active. This access may be in either the data memory or I/O address space of the Local Bus. If *CSEL is disabled, the DTC responds to an access which meets the following criteria:

1. Bits 31-11 of the address for the access match corresponding bits of the Chip Select Address field of the Chip Select Mapping Register
2. The address space (data memory or I/O) for the access matches that specified by the Local Address Space bit of the Chip Select Mapping Register.

If the above criteria are met, the DTC uses the offset portion of the address (bits 10-2) to select an internal register. All accesses to DTC internal registers are word-length accesses, and the DTC responds with *DERR if the OPT0-OPT1 signals are not 00 for an internal register access (the Data Width Exception bit or the Global Status Register indicates the reason for the exception). In any case, the A1-A0 signals are ignored.

For a load (R/*W HIGH), the contents of the selected register are sent to the Local Bus. An unimplemented register bit is read as 0. For a store (R/*W LOW), the selected register is written with the contents of the D31-D0 lines. Any of the D31-D0 lines corresponding to an unimplemented register bit is ignored, but, according to the preferred embodiment, should be 0 for upward compatibility considerations.

The DTC does not successfully complete an access even though it responds to the access, if any of the following conditions apply:

1. The DTC is in the User mode, as indicated by the SUP/*US output being LOW.
2. The address for the access is within the range of addresses recognized by the DTC, but the offset does not select an implemented register.

In each of the above cases, the DTC responds to the access with a *DERR indication. The Protection Violation or Accessing Error bit (as appropriate) of the Global Status Register is set to indicate the reason for the *DERR response.

Where appropriate, the DTC can perform a burst mode access in response to a RISC processor Load Multiple or Store Multiple instruction. The DTC contains the appropriate address incrementing logic to properly support the burst mode access. However, burst mode accesses can only be used to access registers with contiguous offset values. If any unimplemented register is encountered in the burst mode sequence, the DTC responds with a *DERR indication, cancelling the access.

It is possible to configure a DMA channel so that its range of Local Bus addresses overlaps the range of addresses for DTC internal registers. However, the DTC does not support internal register accesses via DMA channels. If such an access is attempted, an address conflict occurs, and the DMA transfer is cancelled. The Address Conflict bit of the appropriate Channel Status Register is set to indicate the reason for the exception.

The overview of the invention, with reference to FIG. 3, indicated that Remote programmed I/O via a DTC I/O port allows a RISC processor attached to the Local Bus to access devices and memories on the Remote Bus. The details of how remote programmed I/O is achieved using the DTC will now be set forth.

The DTC incorporates four independent I/O ports for Remote Bus accesses. Each I/O port:

1. maps a power of two range of Local Bus addreses to an independent range of Remote Bus addresses,
2. supports byte, half-word and word accesses, and
3. contains facilities for overlapping Remote Bus accesses with other RISC processor operations.

Remote programmed I/O accesses are controlled by the I/O Port Registers. There are four identical sets of registers (one set per I/O port) were described hereinbefore.

As indicated hereinbefore, the I/O ports accept accesses from the Local Bus, and pass them to the Remote Bus. Address translation is performed between the Local and Remote buses. The packing and funneling operations allow the data width for the Local Bus request to be greater than the data width for the Remote Bus request.

The connection between the Local and Remote buses may be direct or decoupled. In the case of a direct connection, the Remote Bus access must complete before the Local Bus access can complete. In the case of a decoupled access, data is buffered so that the Local Bus access reads the results of a previous Remote Bus read, or writes data for the next Remote Bus write, independent of Remote Bus operation.

If a request from an I/O port for the Remote Bus occurs at the same time as a request from a DMA channel, the I/O port has priority.

Accesses via I/O ports are controlled by the Local Base Address Register associated with each I/O port. This register specifies the Local Bus base address of the respective I/O port and whether this address is in the data memory or I/O address space of the RISC system.

An I/O port becomes active whenever the following conditions are met:
1. The appropriate Port Enable bit in the Global Mode Register is set.
2. The appropriate high order bits of the Local Bus address match corresponding bits of the Local Base Address Register.
3. The address space (data memory or I/O for the access matches that specified by the Local Address Space bit of the Port Mode Register.

It should be recalled that the *CSEL input has no effect on I/O port accesses.

If the above criteria are met, the DTC replaces the high order bits of the local address used in the above comparison with corresponding bits of the Remote Base Address Register; the low order bits (i.e. the port offset) are unmodified. The resulting address is used for the Remote Bus access, in either the memory or I/O space of the Remote Bus, as determined by the Remote Address Space bit of the Remote Base Address Register.

Figure 6:
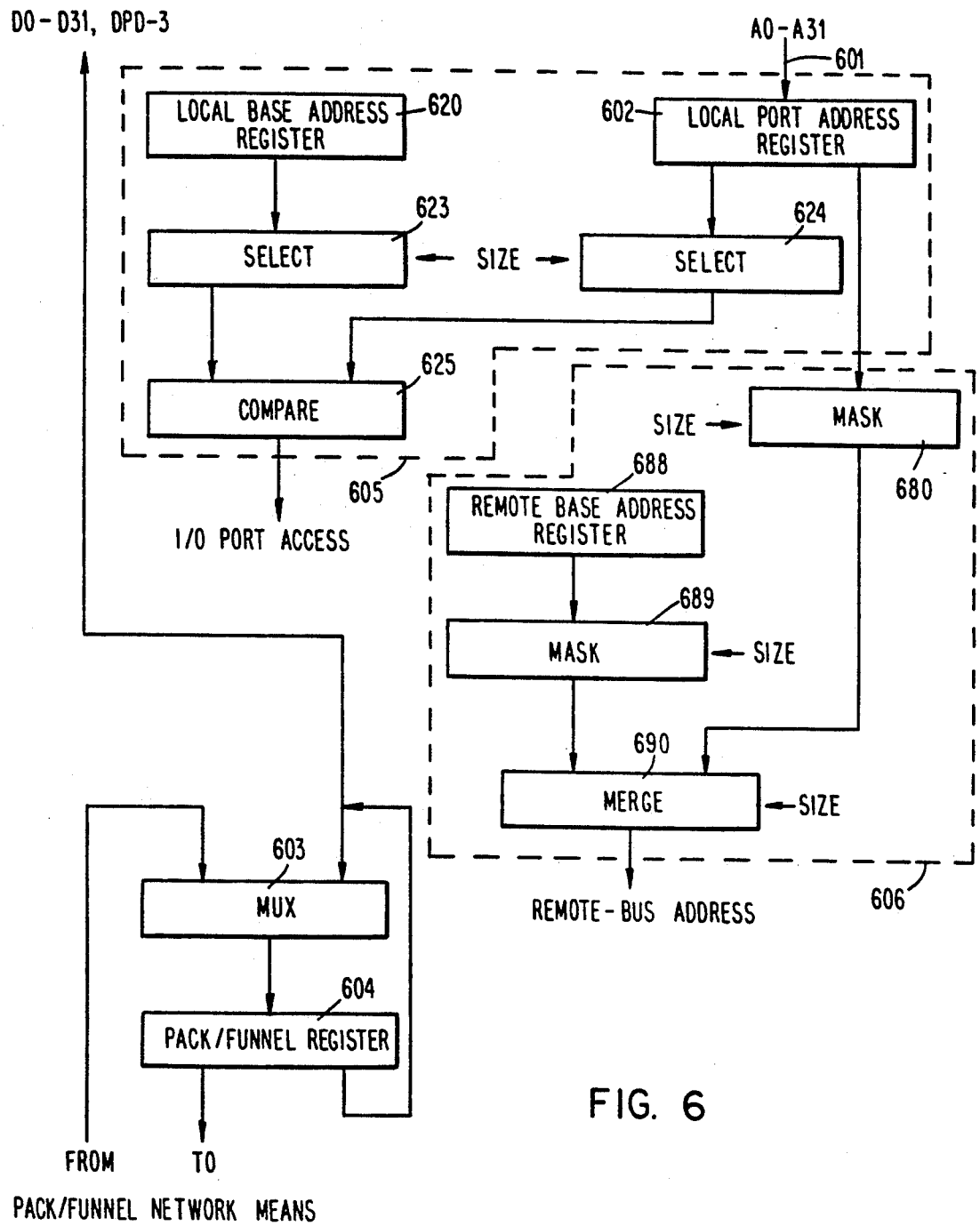
FIG. 6 is a block diagram illustrating I/O port data flow for one I/O port.

FIG. 6 illustrates the address translation process, and shows the data flow for an I/O port.

FIG. 6 shows a 32-bit Local Bus address being input on line 601 to Local Port Address Register 602. Data from D0-D31 (and parity bits D0-D3) can flow either to or from the Pack/Funnel network means (means 304 as shown in FIG. 3) via MUX 603 and Pack/Funnel Register 604, both part of the FIG. 6 related I/O port.

Address translation occurs by first determining if the access is within the port's address space (via block 605) and, if so, translating the address (via block 606).

In block 605 the contents of the Local Base Address Register, 620, is compared with the contents of the Local Port Address Register, 602, (via comparator 625) after selecting (via block 623 and 624) bits for the comparison based one the size of the port. For example, for a 1 kilo-byte port the high order 22 bits from registers 602 and 620 are compared. The window size information, as indicated hereinbefore, comes from the window size field of the Port Mode Register.

If the I/O port is in fact being addressed, address translation via block 606 occurs by masking out (using the window size information again), via block 680, the appropriate high order bits from the Local Bus Address and by utimately merging the remaining low order bits with the high order bits preserved by masking out the same number of low order bits from the Remote Base Address in register 688. This second mask is performed by block 689.

As a result of the merge, shown performed (in FIG. 6) by block 690, the Remote Bus Address is developed. For the 1 kilobyte window example referred to above, the translated address will have its high order 22 bits from the contents of the Remote Base Address Register, and low order 10 bits from the Local Port Address Register, in effect maintaining the appropriate port offset in the address translation process.

It is possible that the range of local addresses for a given I/O port overlaps the range of addresses for another port. If this occurs, the I/O port with the lowest number has priority in the preferred embodiment of the invention. For example, if the address range for I/O port 0 overlaps the address range for I/O port 2, I/O port 0 has priority. The range of remote addresses for an I/O port may also overlap those of another I/O port. However, since only one I/O port can be active on the remote bus at any time, there is no contention.

The Supervisor Access Only ("SUP") bit of the Port Mode Register associated with each port determines whether or not the port may be accessed by a User-mode program. If a User-mode access (as indicated by the SUP/*US signal) is attempted to an I/O port whose SUP bit is 1, the DTC does not perform the requested Remote Bus access. It responds to the access with a *DERR indication. The Protection Violation bit of the relevant Port Status Register is set to indicate the reason for the *DERR response.

It is possible to configure a DMA channel so that its range of Local Bus addresses overlaps the range of addresses for an I/O port. However, the DTC does not support I/O port accesses via DMA channels. If such an access is attempted, an address conflict occurs, and the DMA transfer is cancelled. The Address Conflict bit of the appropriate Channel Status Register is set to indicate the reason for the exception.

The normal operation of each I/O port is as follows:
For a load (R/*W HIGH) directed to an I/O port, the DTC performs a read access on the Remote Bus (multiple reads can occur if packing is required), and the accessed data is returned in response to the load. If an exception occurs during the Remote Bus access (e.g. because of an *RBERR response or a parity error), the DTC responds with *DERR on the Local Bus. In case of a *DERR response, the relevant Port Status Register indicates the reason.

For a store (R/*W LOW) directed to an I/O port, the DTC performs a write access on the Remote Bus using data supplied for the store (multiple writes can occur if funneling is required). If an exception occurs during the Remote Bus access, the DTC responds with a *DERR on the Local Bus. In case of a *DERR response, the relevant Port Status Register indicates the reason.

Where appropriate, the DTC can perform a burst mode access via an I/O port, in response to an RISC processor Load Multiple or Store Multiple instruction. The DTC contains the appropriate address incrementing logic to properly support the burst mode access. On the Remote Bus, this transfer is performed as a block mode.

Burst mode accesses can be used only to access data with contiguous word addresses on the Local Bus. The data width on the Local Bus should be 32 bits. Packing and funneling can convert these word accesses to or from accesses of a narrower width on the Remote Bus, with the limitation that an integer multiple of 4 bytes, or 2 half-words, must (according to the preferred embodiment of the invention) be transferred.

If the *LOCK signal is active for an I/O port read, the DTC performs a read-modify-write access on the Remote Bus. This access is distinguished from other Remote Bus accesses in that the *RMW output is asserted at the beginning of the read access. *RMW is held active until the write access completes the read-modify-write sequence.

The DTC performs no special implicit sequencing as the result of the *LOCK signal, but simply acts to pass the sequencing performed by the RISC processor Load and Set instruction through to the Remote Bus. Thus, the write which completes the read-modify-write sequence occurs as the result of a write on the Local Bus.

Although other synchronization protocols may be deviced by those skilled in the art, the preferred embodiment of the invention, described with reference to the RISC system in the incorporated copending application, can only implement the Load and Set semantics of the RISC processor and does not explicitly support any other synchronization/exclusion protocol.

If the Overlapped I/O (OIO) bit of a Port Mode Register is set, the associated I/O port performs read ahead and write behind operations, instead of direct reads and writes to the Remote Bus. These special operations allow the Local Bus processor to overlap other operations with Remote Bus accesses.

Figure 7:
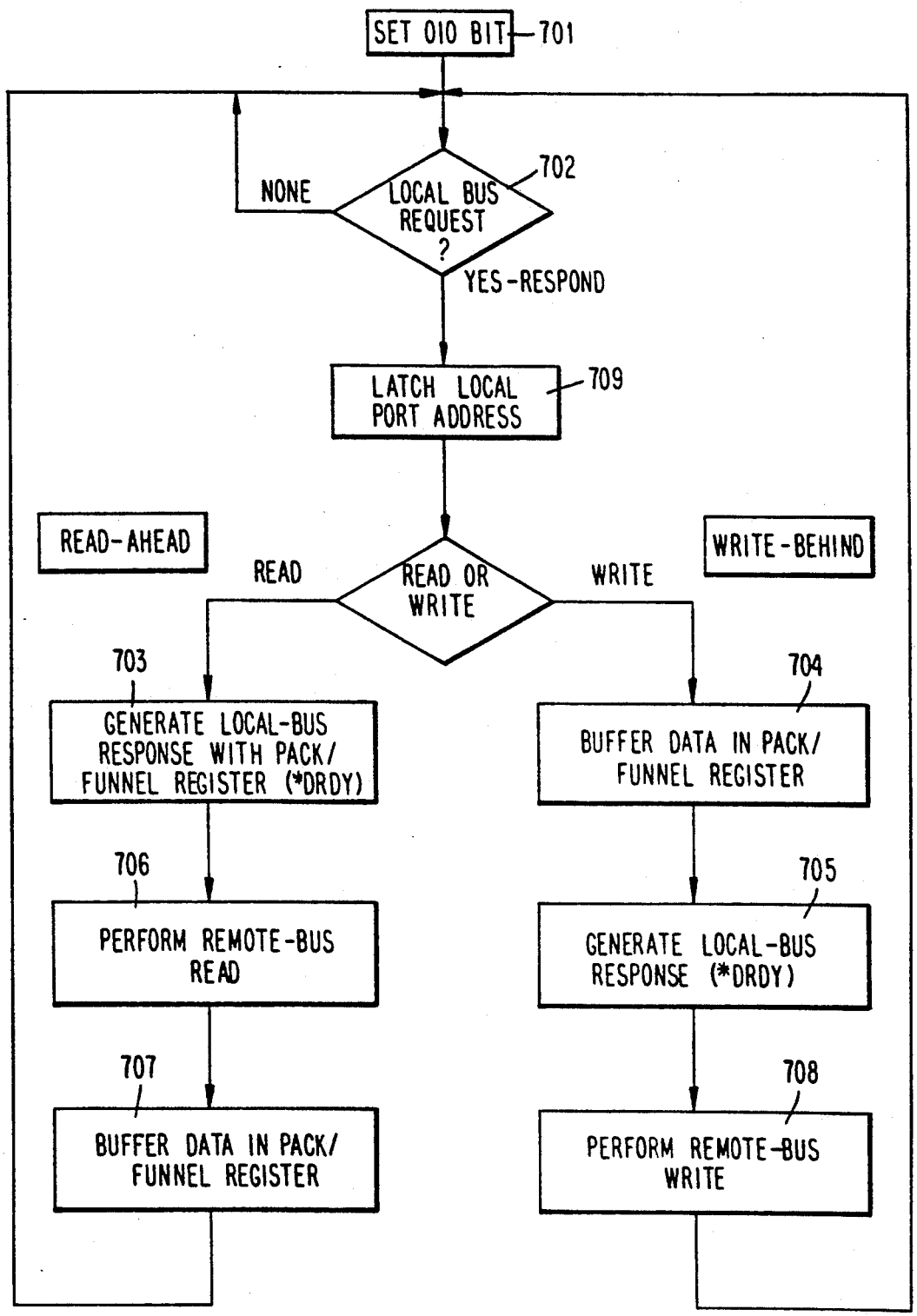
FIG. 7 is a flow chart illustrating how the DTC supports overlapped I/O.

FIG. 7 shows a flow chart for read ahead and write behind operations. Reference will be made to blocks 701-709 of FIG. 7 in setting forth the description of overlapped I/O.

When the OIO bit of a Port Mode Register is first set (block 701 in FIG. 7) the associated I/O port is placed in as state such that it will immediately respond to the next access, instead of waiting on the Remote Bus access to be performed (block 702). If the next access is a load, (read), the I/O port responds (block 703), with the contents of its Pack/Funnel Register (which are most likely undefined). If the next access is a store (write), the I/O port stores the associated data in the Pack/Funnel Register (block 704). For both loads and stores, the I/O port buffers the address for the access in the Local Port Address Register (block 709).

The Local Bus access then completes, (*DRDY sent back, see blocks 703 and 705) independent of any access on the Remote Bus. However, the I/O port is in a state such that it performs the required Remote Bus access at the earliest opportunity (which may depend on Remote Bus arbitration and other DTC activity).

To perform read ahead or write behind, the I/O port translates the address in the Local Port Address Register (this register holds an untranslated address to allow recovery in the case of an exception, without requiring a reverse translation). Then, for a read ahead, the I/O port performs a Remote Bus read (block 706) using the translated address. The data for this read is stored in the Pack/Funnel Register (block 707), when the read completes (note that packing may be performed). For a write behind, the I/O port performs a Remote Bus write (block 708), using the translated address. The data for this write is supplied by the Pack/Funnel Register (and funneling may be performed).

While the I/O port is performing a read ahead or write behind on the Remote Bus, it does not accept a second access from the Local Bus (although the DTC may accept accesses to other I/O ports of internal registers). The I/O port accepts a second Local Bus access only after the Remote Bus access completes. Normally, the second access is of the same type (read or write) as the first.

If an access on another I/O port becomes active before the read ahead or write behind has begun (i.e. if there is another access contending for the Remote Bus), the second access is held off until the first completes.

In the case of read ahead, the second read to the same I/O port obtains the data from the first read and supplies an address for a second Remote Bus read. In the case of write behind, the second write to the same I/O port buffers additional data and a second address for a second Remote Bus write. In both cases, if an exception occurred during the first Remote Bus access, the DTC responds to the second Local Bus access with a *DERR indication (the relevant Port Status Register indicates the reason for the exception).

The sequence of read ahead and write behind operations proceeds until all accesses have been completed. Note that while write behind has relatively straightforward behavior, read ahead requires an additional access at the beginning and end of the sequence in order to transfer all data. Read ahead requires an initial Local Bus read to supply the address for the first Remote Bus read. Furthermore, the last Local Bus read in the sequence generates an access on the Remote Bus, even though this access is unnecessary.

Reads and writes cannot be effectively intermingled during read ahead and write behind. If a read is performed to a port which was previously performing a write behind, the data obtained is undefined. If a write is performed to a port which was previously performing read ahead, the data held in the Pack/Funnel Register is destroyed. According to the preferred embodiment of the invention, software is responsible for generating the correct sequence of reads and writes for the desired operaion. Note in particular that a read-modify-write sequence cannot be properly performed by a port which is configured to perform read ahead or write behind.

If it is desired to intermix reads and write using read ahead and write behind, two I/O ports must be used. One I/O port is used for read ahead, and the other for write behind. Note, however, that ultimate performance may be limited by the capacity of the Remote Bus.

To complete the description of the programmed I/O supported by the DTC, it should be noted that a number of exceptions may occur during a programmed I/O transfer, preventing the transfer from completing successfully. If an exception occurs during a programmed I/O transfer, the DTC responds on the Local Bus with a *DERR indication.

The following exceptions, in prioritized order where applicable, may occur during a programmed I/O transfer:

1. Protection Violation. A User mode program (as indicated by the SUP/*US signal) attempts an access to an I/O port which is set for Supervisor mode accesses only, or attempts to access an internal DTC register.
2. Addressing Error. The offset for an internal register access corresponds to an unimplemented register.
3. Parity Error. The DTC detects invalid parity during a transfer. Parity is checked immediately after data is received from the Remote Bus. Parity is not checked for a programmed I/O write from the Local Bus.
4. Remote Bus Error. An *RBERR response is received to a Remote Bus transfer.
5. Data width Exception. The DSACK0-DSACK1 response to an I/O port transfer indicates that the Remote Bus device or memory cannot handle a transfer of the requested width, or a byte or half-word access to a DTC internal register is attempted.

When the exception is reported with *DERR, the Global Status Register is set to indicate which of the I/O ports has encountered the exception, or indicates that the exception occurred on an internal register access. If the exception occurred for an I/O port access, the Port Status Register of the indicated I/O port indicates the reason for the exception.

In the case of an I/O port implementing read ahead or write behind, the reported exception occurred on the most recent Remote Bus access. The Local Port Address Register contains the untranslated address for this access, and may be used by software to restart the access if possible. For writes, the data used to restart the access is held by the Pack/Funnel Register. In all other cases, the information concerning the programmed I/O access is contained in the RISC processor Channel Address, Channel Data and Channel Control registers, and can be restarted by these registers.

DMA transfers as supported by the DTC will now be described in detail.

As used in the following description, the term (or abbreviation) "direct memory access" (DMA) describes any access or data transfer which is independent of instruction execution in the RISC processor. This term is somewhat inaccurate, since DMA transfers do not necessarily access memory on the Local Bus. In some cases, Remote Bus data is transferred to and from the DTC's DMA queues, with the RISC processor directly manipulating data in the queue. However, of the terms in popular use, "direct memory access" and "DMA" best describe the function implemented by the DTC.

As indicated hereinbefore, DMA transfers occur via four DMA channels implemented by the DTC. Each of these channels is initialized by the RISC processor to perform a particular data transfer, and the actual transfer takes place without further intervention by the processor. If enabled to do so, the channel may generate a processor interrupt (by asserting *INTR) when the transfer terminates normally, or when it is cancelled because of an exception.

Because DMA transfers require little processor intervention, a large amount of data can be transferred concurrently with processor execution. For example, in multiprogramming or multitasking environments, other processes may be executed while a given process waits for a DMA channel to complete a data transfer.

The DTC's DMA channels are designed to support a large degree of flexibility. The performance of DMA transfers is maximized on both the Local and Remote Buses, with provisions for limiting the contention for Local Bus resources between the DTC and RISC processor.

Figure 8:
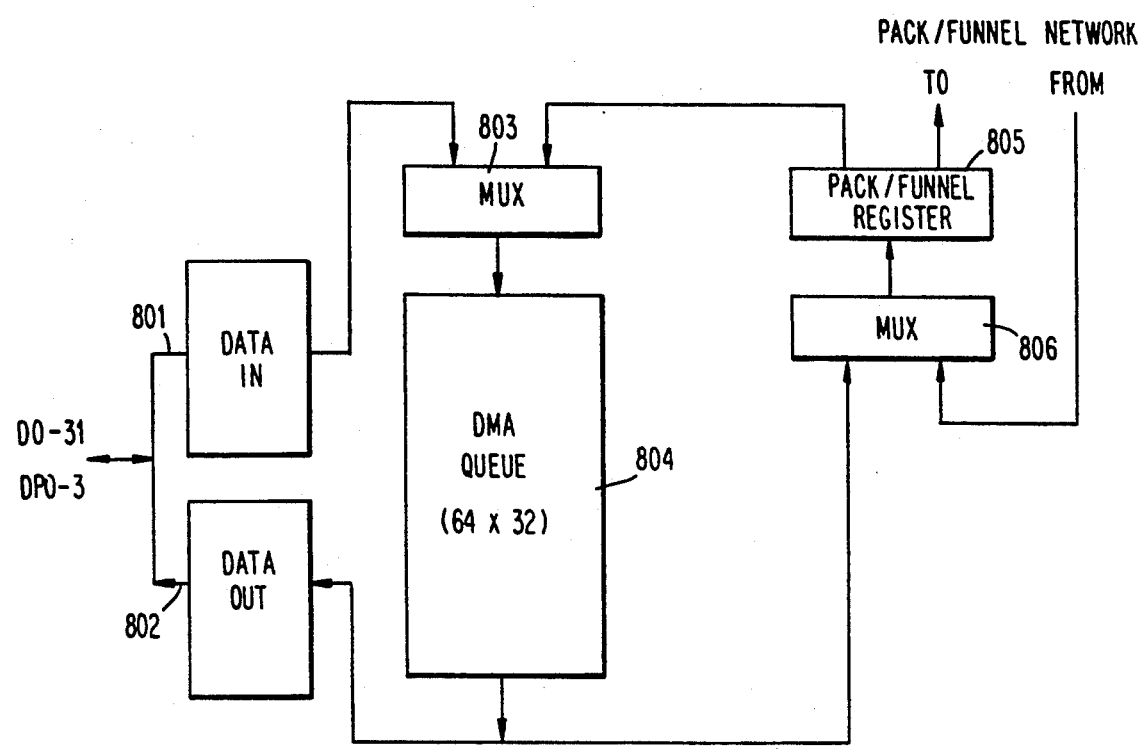
FIG. 8 is a block diagram illustrating DMA channel data flow for one DMA channel.

DMA transfers on the Local Bus are relatively independent of transfers on the Remote Bus, because of the large degree of buffering provided by the DMA queues. This is reflected in the organization of the DMA Channel Registers; many registers effect only the Local Bus side or the Remote Bus side of the DMA channel. FIG. 8 shows the data flow diagram of a DMA channel.

FIG. 8 depicts data on D0-D31 (and parity bits) going into (line 801) or coming out of (link 802) the depicted DMA channel.

Incoming data is multiplexed, via MUX 803 into the 64 word queue, 804, for the channel. Obviously, larger or smaller queues could be utilized in fabricating the DTC. Data flows out of the queue and to the Pack-/Funnel network via Pack Funnel Register (805) and MUX 806. MUX 806 serves to channel data from the Pack/Funnel network into queue 804 via register 805 and MUX 803, in addition to allowing data to be output from queue 804 to the Pack/Funnel network.

It should be noted that on the Local Bus, DMA transfers occur only to the RISC system's data memory address space.

For remote to local DMA transfers, data is read from the Remote Bus, with an addressing pattern specified by the Channel Mode Register and tracked by the Remote Address Register. The number of bytes transferred is tracked by the Remote Byte Count Register. This data is placed into the appropriate DMA queue (possibly after packing), and subsequently transferred to the Local Bus, except when the Local Bus transfer is disabled, in which case the data is transferred or inspected by the processor on the Local Bus.

The addresses for Local Bus transfers are always sequentially increasing word addresses, and are tracked by the Local Address Register. The number of bytes transferred is tracked by the Local Byte Count Register.

Remote Bus transfers continue until the Remote Byte Count matches the value in the Terminate Count Register. Following that, Local Bus transfers continue until the Local Byte Count matches the value in the Terminate Count Register (because of data buffered in the DMA queue). When the Local Byte Count matches the Terminate Count, the transfer has terminated, and *INTR is asserted if enabled.

For local to remote DMA transfers, data is read from the Local Bus (except when the Local Bus transfer is disabled, in which case the data is loaded by the processor on the Local Bus), with a sequentially increasing addressing pattern tracked by the Local Address Register. The number of bytes transferred is tracked by appropriate DMA queue, and subsequently transferred to the Remote Bus (possibly with funneling).

The addresses for Remote Bus transfers have an addressing pattern specified by the Channel Mode Register and tracked by the Remote Address Register. The number of bytes transferred is tracked by the Remote Byte Count Register.

Local Bus transfers continue until the Local Byte Count matches the value in the Terminate Count Register. Following that, Remote Bus transfers continue until the Remote Byte Count matches the value in the Terminate Count Register (because of data buffered in the DMA queue). When the Remote Byte Count matches the Terminate Count, the transfer has terminated, and *INTR is asserted if enabled.

Each DMA channel has an associated DMA queue which buffers data while it is transferred between the Local and Remote Buses. According to the preferred embodiment of the invention, each of these queues is 256 bytes in size, and is organized as 64 words. Again, only words are transferred to and from the queues on the Local Bus. On the Remote Bus, words, half-words, and bytes may be transferred, because of the packing and funneling operations. The DMA queues serve two purposes, as discussed hereinafter.

For true DMA transfers (i.e. those transfers that actually access Local Bus memory), the buffering provided by the DMA queues allows the Local Bus DMA transfer to proceed at a rate of up to 100 Mbyte/sec, using the burst mode capability of the Local Bus. The contents of the entire queue may be transferred by a single burst mode store, or the queue may be entirely filled by a burst mode load.

In addition to supporting burst mode accesses, the DMA queues reduce the effect of Local Bus aquisition for DMA transfers. Two cycles are normally required for the DTC to acquire and relinquish the Local Bus, and the Local Bus cannot be used during these cycles. If only one word were transferred for each acquisition, the overhead represented by these cycles would be relatively high. By allowing as many as 64 words to be transferred with one aquisition, the DMA queues help minimize this overhead.

A second purpose of the DMA queues is to provide a buffer area for direct manipulation by the RISC processor. In some systems, it is advantageous for the processor to assemble data to be transferred to the Remote Bus directly in the DMA queue, and to read data transferred from the Remote Bus directly from the DMA queue. In this case, the DMA queue is configured to appear as an extension of the Local Bus memory. This avoids the latency involved in the extra transfer to or from Local Bus memory. However, direct transfers are appropriate only when the data involved fits into the 64 word area provided by the DMA queue.

The DMA queues are implemented, in the preferred embodiment of the invention, by a 256 word array, which is divided into 4, 64 word partitions. The queues are visible as DTC internal registers on the Local Bus.

Queue Status Register (previously described) associated with each DMA channel give the state of the associated DMA queue. The Queue Status Register includes the Queue Head (QH) field, which contains the address of the word at the front of the queue; and the Queue Tail (QT) field, which contains the address of the (empty) word at the end of the queue.

When a DMA channel is initialized to perform a DMA transfer (by setting the RST bit in the Channel Status Register), both the QH and QT fields are set to zero. During the DMA transfer, data is placed into the queue at the location identified by the QT field, and the QT field is incremented by one after data is written. The QT field thus always points to the next empty location in the queue. Data is removed from the queue at the location identified by the QH field, and the QH field is incremented by one after data is read. The QH field thus points to the next valid queue location, except when the queue is empty.

Figure 9C:
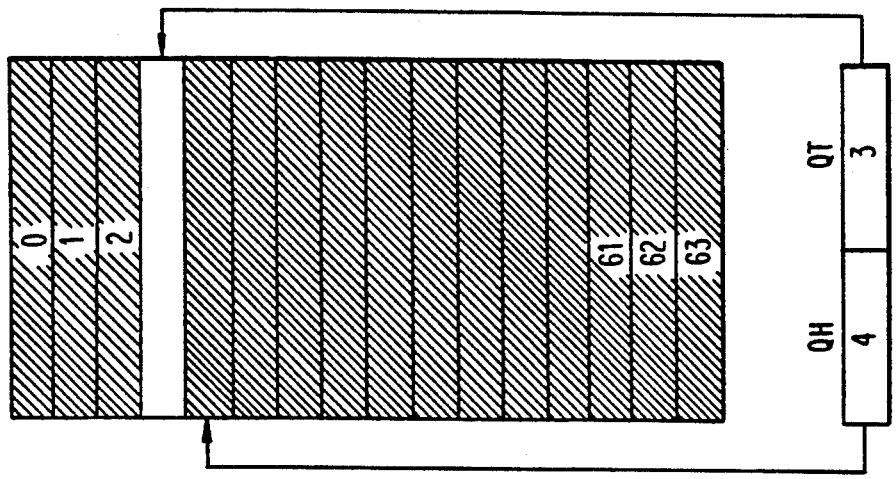
FIG. 9 illustrates empty, partially full and full DMA queues.
Figure 9B:
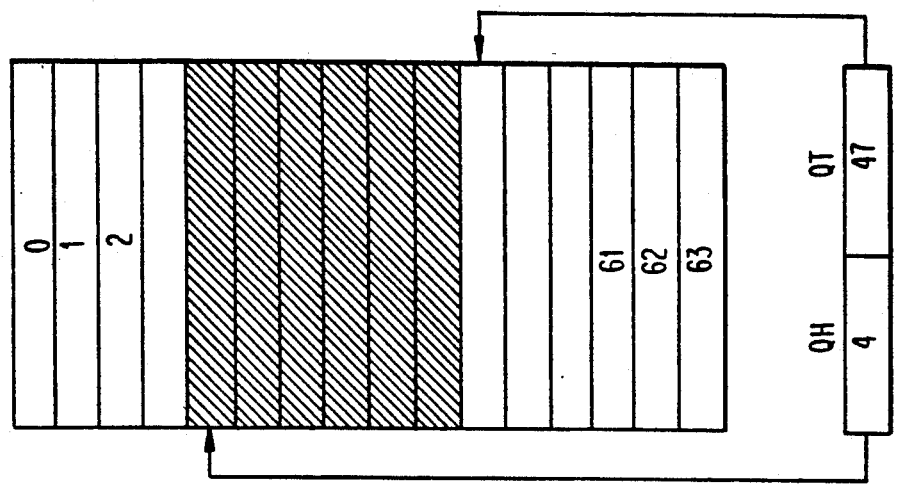
Figure 9A:
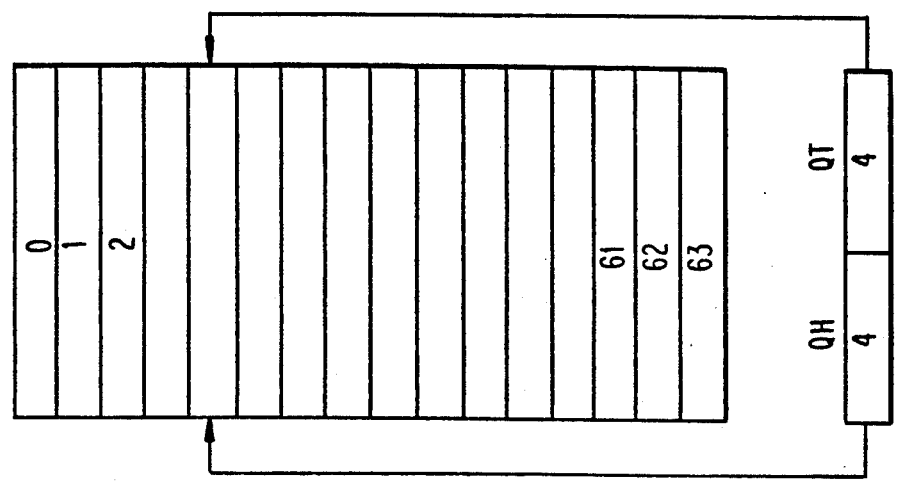

The value of the QH field is equivalent to the value of the QT field only for an empty DMA queue. A full queue is identified by a QT field whose value is one less (modulo 64) than the value of the QH field. The relationship of the QH and QT pointers for an empty, partially full, and full queue are shown in FIG. 9.

When a DMA queue is used to transfer patterns (i.e. the queue pattern bit of the Channel Mode Register is set, the QH field identifies the queue location containing the pattern (the location must be explicitly written with the pattern). The QH field is not changed as the pattern is transferred. In this configuration, the value of the QT field is unimportant.

The Queue Status Register may be written to change the state of the queue; however, this may have an unpredictable effect if a DMA transfer is in progress.

DMA transfers are subject to various control conditions and configurations. These conditions and configurations, and how they relate to DMA transfers on both the Local and Remote Buses as described hereinafter.

A DMA channel is enabled and disabled by setting the appropriate channel bit of the Global Mode Register. A disabled DMA channel is prevented from performing any transfer, regardless of other enabling condition. An enabled DMA channel can perform transfers if other conditions are such that the transfer can occur. These are discussed hereinafter. It is assumed that an enabled DMA channel has been configured for a valid transfer.

A DMA transfer on an enabled DMA chanel may be in one of the following operational conditions at any given time:

1. Pending. The DMA channel is prepared to perform a transfer on the Local or Remote Bus, but the transfer is not actually taking place. A DMA transfer may be pending because of bus arbitration latency, or because of a higher priority DMA request.
2. Active. The DMA channel is currently performing a DMA transfer on either the Local or Remote Bus.
3. Inactive. DMA transfers are suspended by the Channel Active (CA) bit of the Channel Status Register. This bit may be reset and set by software to temporarily suspend and resume DMA transfers on the DMA channel.
4. Terminated. The DMA channel has performed all required accesses. The CA bit of the Channel Status Register is reset when a DMA transfer terminates.
5. Preempted. The DMA channel has not performed all transfers, but the sequence of transfers is temporarily suspended. In many cases, this condition arises because of data flow control. However, a DMA transfer may be preempted by bus arbitration, a higher priority DMA request, or some other condition not directly related to the transfer.
6. Cancelled. DMA transfers are prevented, even though there are further transfers remaining, because of some exceptional event, such as a parity error. The CA bit of the Channel Status Register is reset when a DMA transfer is cancelled.

When a DMA transfer terminates or is cancelled, the corresponding DMA queue is emptied (if possible), and the CA of the associated Channel Status Register is reset, causing the DMA channel to become inactive. At this time, if the Interrupt Enable bit of the Channel Mode Register is set, and the Global Interrupt Enable bit of the Global Mode Register is set, the DTC asserts the *INTR output. This permits an interrupt (or trap) to the RISC processor.

DMA transfers between the Local and Remote Buses are subject to flow control (i.e. transfer rate control) at several points in the path between the Local and Remote Buses:

1. Local Bus memory. The Local Bus memory, at various times, may not have enough capacity to satisfy the aggregate demand of all DMA channels.
2. Local Burst/Dwell counts. The Local Burst/Dwell Register limits the amount of data which can be transferred on the Local Bus, and may represent a more severe restriction on the flow of data than the capacity of the Local Bus memory. Burst/dwell counts are provided to limit the contention for Local Bus generated by the DTC.
3. Remote Burst/Dwell counts. The Remote Burst/Dwell Register limits the amount of data which can be transferred on the Remote Bus, to limit the contention for the Remote Bus generated by the DTC. This applies only for certain modes of transfers (e.g. demand mode) where large amounts of data may be transferred with a single request.
4. Remote Bus devices or memories. Devices or memories on the Remote Bus can limit the flow of data using the appropriate *DRQ0-*DRQ3 input. In addition, the flow of data may be limited instantaneously by DSACK0-DSACK1, or the Remote Wait Count and Remote Recovery Count of the Channel Mode Register.

For cases 1 and 2 above, the DTC must exercise flow control at the Remote Bus side of one or more DMA channels, reflecting the Local Bus limitation to the remote side. If a DMA queue does not have any data to satisfy a Remote Bus write, or if the DMA queue does not have a location to receive the data of a Remote Bus read (i.e. it has only one empty location), the DTC does not perform a DMA transfer requested by *DRQ0-*DRQ3 (and does not acknowledge the request) until the condition no longer exists.

In general, any of the above flow control mechanisms can limit the flow of data. However, the burst/dwell counts on either the Local or Remote Bus cannot preempt an in-progress access. If a burst/dwell limitation is required, it is imposed on the transfer following any transfer in progress.

DMA transfers to and from the Local Bus, if enabled by the Local Transfer Disable bit of the Channel Mode Register, are not requested on the Local Bus (as they are on the Remote Bus). Local Bus DMA transfers are activated by the state of the DMA queue and the operational condition of the DMA channel.

For a remote to local DMA transfer, the Local Bus transfer becomes pending whenever there is one remaining unused word in the DMA queue. This word cannot be filled, because the Queue Head and Queue Tail pointers cannot be allowed to be equivalent for a full queue. Under normal conditions, the DMA transfer remains active until the queue is emptied (note that the DMA queue may be filled concurrently from the Remote Bus). However, the transfer is subject to any other condition discussed above (such as preemption, burst/dwell counts, etc.)

For a local to remote transfer, the Local Bus transfer becomes pending when the DMA queue contains a single untransferred word, or when the queue is empty. Under normal condition, the DMA transfer remains active until the queue is full (note that the DMA queue be emptied concurrently from the Remote Bus). However, the transfer is subject to any other condition discussed above.

If a remote to local transfer terminates or is cancelled, the associated DMA queue must be emptied (if the exception is not caused by the Local Bus, e.g. *DERR). When either of these conditions arise, the Local Bus transfer becomes immediately pending, and the DMA queue is emptied before *INTR is asserted (*INTR is asserted only if enabled).

Each DMA channel has several registers, all previously discussed herein, for controlling and tracking the amount of data transferred. These are the following:
1. Local Byte Count Register
2. Local Alarm Count Register
3. Remote Byte Count Register
4. Remote Alarm Count Register
5. Terminate Count Register When a DMA transfer is initiated the Local Byte Count Register and Remote Byte Count Register are both set to zero. As DMA transfers occur, each register individually counts the number of bytes transferred on the respective bus. The Local Byte Count Register counts in units of 4 bytes, and the Remote Byte Count Register counts in units determined by the Data Width field of the Channel Mode Register.

During DMA transfers, the value of the Local Byte Count Register is compared to the value of the Local Alarm Count Register, and the value of the Remote Byte Count Register is compared to the value of the Remote Alarm Count Register. The values of both the Local Byte Count Register and the Remote Byte Count Register are compared to the value of the Terminate Count Register.

The Local Alarm Enable and Remote Alarm Enable bits of the Channel Mode Register enable the DTC to generate an interrupt (if otherwise enabled) when the local or remote byte count, respectively, matches or exceeds the corresponding alarm count. The Local Alarm Reached or Remote Alarm Reached bit of the Channel Status Register is set to cause the interrupt.

The alarm interrupts provide a means for interrupting the RISC processor when a particular point in the DMA transfer has been reached, independent of any termination condition. For example, this can notify the RISC processor that the header portion of a communications packet has been received, allowing the header to be inspected while the remainder of the packet is being transferred.

The comparisons to the value of the Terminate Count Register indicate that the DMA channel has reached the termination condition. Because of the buffering provided by the DMA queue, the Remote Bus and Local Bus sides of the DMA channel most likely do not reach the termination count at the same time.

When either side reaches the termination count, DMA activity is terminated on the respective bus. Furthermore, when the Remote Bus side reaches the termination count on a remote to local transfer, the contents of the DMA queue are transferred to the Local Bus (if enabled to do so) regardless of the amount of data in the queue (that is, the queue is flushed empty).

The total number of bytes transferred on the Local or Remote Bus for a DMA transfer may be slightly higher than the number specified by the Terminate Count Register, depending on the relationship of the value in this register to the data widths on the Local Bus and Remote Buses. The terminate count value is in units of bytes. If this number of bytes cannot be transferred by an integral number of transfers on either bus, data is transferred until the count is exceeded.

For example, consider that the Terminate Count Register is set to the value 41 when a DMA transfer is initialized, and that the Remote Bus data width is 16 bits. In this case, 44 bytes (11 words) will be transferred on the Local Bus, and 42 bytes (21 half-words) will be transferred on the Remote Bus.

If the Local Transfer Disable bit of the Channel Mode Register is set, disabling DMA transfers to the Local Bus, the Local Address Register and Local Byte Count Register do not change. The effects of all comparison made on the value of the Local Byte Count Register are disabled, and the termination condition depends on the Remote Byte Count Register.

When more than one DMA request is pending at a particular instand in time, the conflicting DMA request are resolved by prioritizing DMA request. Priorities among the DMA channels can be either fixed or rotating, as controlled by the Channel Priority Rotating bit of the Global Mode Register.

When DMA channel priorities are fixed, the priorities, according to the preferred embodiment of the invention, of DMA channels are fixed in numerical order, with DMA channel 0 having the highest priority. Thus, a request on DMA channel 0 has priority over a request on DMA channel 1, and so on.

When DMA channel priorities are rotating, the priorities of DMA channels are ordered by the amount of time since the most recent transfer, the channel with the longest inactive period is given the highest priority. Note that the rotation is not implemented by scanning the request of each channel on a cycle-by-cycle, as might be implied. Rather, a given DMA channel is assigned the lowest priority immediately after it begins a DMA transfer, and channels rotate through the lowest priority as their requests are satisfied.

Note that prioritization affects the final stages of a decision to service a particular DMA request. For example, a request for a DMA read on the Remote Bus will not be involved in prioritization if the associated DMA queue is full, even when the channel has high priority.

In cases where more than one DMA channel can perform a Local Bus transfer at a given instant in time, the conflict is resolved according to the channel priorities which apply at that instant.

If an I/O port access becomes pending at the same time as a DMA transfer, the I/O port has priority in the use of the Remote Bus. Furthermore, if an I/O port access becomes pending while a DMA transfer is active, it may preempt the transfer.

There are several exceptions which can occur during a DMA transfer. Any of these exceptions causes the DMA transfer to be cancelled, with the *INTR output being asserted (if enabled). For a remote to local transfer, the DMA queue is flushed before *INTR is asserted.

The following exceptions, in the preferred embodiment's prioritized order where applicable, may occur during a DMA transfer:
1. Parity Error. The DTC detects invalid during a transfer. Parity is checked immediately after data is received from either bus, so that data in DMA queues always has valid parity.
2. Remote Bus Error. An *RBERR response is received to a Remote Bus transfer.
3. Data Width Exception. The DSACK0-DSACK1 response to a DMA transfer indicates that the Remote Bus device or memory cannot handle a transfer of the requested width.
4. Address Conflict. The address for a Local Bus transfer overlaps the address for an I/O port, or is an address recognized by virtue of the Chip Select Mapping Register (note that this may be simply an active *CSEL input). This prevents any further Local Bus transfers by the corresponding DMA channel until the exception is serviced.
5. Local Bus Error. A *DERR response is received to a Local Bus transfer. This prevents any further Local Bus transfers by the corresponding DMA channel until the exception is serviced.
6. End Of Process. The *EOP input is asserted during a Remote Bus transfer. This may or may not signal an error, depending on the system.

When *INTR is asserted, the Global Status Register indicates which of the DMA channels has encountered the exception. The Channel Status Register of the indicated DMA channel gives the reason for the exception. If interrupts are enabled, the bits of this register which report exceptions cause *INTR to be asserted. They may be reset by software to deactivate the interrupt. Note also that software may cause *INTR to be asserted by setting one or more these bits.

A description of how a Remote Bus device or memory requests a DMA transfer will now be set forth.

A Remote Bus device or memory requests a DMA transfer by asserting one of the *DRQ0-*DRQ3 inputs, depending on the DMA channel to which it is assigned (IDRQ0 corresponds to DMA Channel 0, and so on). The DTC performs the requested transfer on the Remote Bus, asserting one of the *DACK0-*DACK3 outputs, as appropriate, at the beginning of the transfer.

Devices and memories do not have to control the flow of data with *DRQ0-*DRQ3. In this cae, a DMA channel can be configured to ignore the corresponding *DRQ0-*DRQ3 input, and transfers data at a rate determined by the DTC operational state and other constraints on Remote Bus transfers, such as DSACK0-DSACK1.

A DMA channel responds to the corresponding *DRQ0-*DRQ3 input in one of three modes, as controlled by the DMA Request Response Mode (DRM) field of the appropriate Channel Mode Register. These modes define the behavior of the DMA channel for an assertion of the corresponding *DRQ0-*DRQ3 input.

If the DRM field of the Channel Mode Register is 00, the DMA channel ignores the corresponding *DRQ0-*DRQ3 input. If the channel is enabled for a transfer by the appropriate channel enable bit of the Global Mode Register and the CA bit of the Channel Status Register, the channel transfers data whenever the transfer is otherwise possible (as determined by the state of the DMA queue, the priority of the channel, etc.).

In this mode, the only data flow control mechanism available to the Remote Bus device or memory is that provided by DSACK0-DSACK1 or by the wait/recovery counts in the Channel Mode Register. Since these mechanisms use Remote Bus capacity, they may be inefficient.

The DTC asserts the appropriate *DAK0-*DAK3 output when it begins a DMA transfer on the Remote Bus, even when the corresponding DMA request is ignored.

If the DRM field of the Channel Mode Register is 01, the DMA channel performs a single Remote Bus transfer for each HIGH to LOW transition of the corresponding *DRQ0-*DRQ3 input. The appropriate *DACK0-*DACK3 output is asserted at the beginning of the transfer (i.e. during the address cycle). The DMA request input must be inactive for at least one cycle for a synchronous Remote Bus, or two cycles for an asynchronous Remote Bus, before it can make another HIGH to LOW transition. For maximum throughput, therefore, the DMA request input must be deasserted before a requested transfer is complete.

If the DRM field of the Channel Mode Register is 10, the DMA channel performs Remote Bus transfers as long as the appropriate *DRQ0-*DRQ3 input is active, and as long as other conditions allow the transfer to occur (e.g. priorities of other channels, etc.). The *DACK0-*DACK3 output is asserted during the address cycle of the first transfer, and remains active during all transfers, with the possible exception of the final transfer.

The Remote Bus device or memory may preempt a demand transfer by deasserting *DRQ0-*DRQ3 before the LOW to HIGH transition of *DSTB for the final transfer. Further transfers may be requested by reasserting *DRQ0-*DRQ3 at a later time.

If the DTC terminates or preempts the transfer during an active demand transfer, the appropriate *DACK0-*DACK3 output is deasserted during the final data transfer (concurrent with the assertion of *DSTB). However, if the termination is in response to an *EOP from the Remote Bus, the corresponding *DACK0-*DACK3 output remains active during the final transfer.

It should be noted that a DMA channel performing in a demand mode transfer may prevent DMA service on other channels if it has a high priority.

For rotating priorities, the channel is assigned the lowest priority as soon as it begins the transfer, and cannot prevent service to other channels.

The preferred embodiment of the invention set forth hereinabove is flexible enough so that individual DMA channels may be configured for special operations, such as "block transfers", i.e. such that an address is transferred once for any number of data transfers; and "pattern transfers," i.e., where a DMA channel is programmed to transfer fixed patterns to the Remote or Local Bus.

Prior to concluding this detailed description of the novel DTC, several details and overall system considerations remain to be covered.

First, in order to attach the Remote Bus to the DTC, an interface, as briefly described hereinbefore with reference to FIG. 1 (unit 105), may optionally be utilized.

Figure 10:
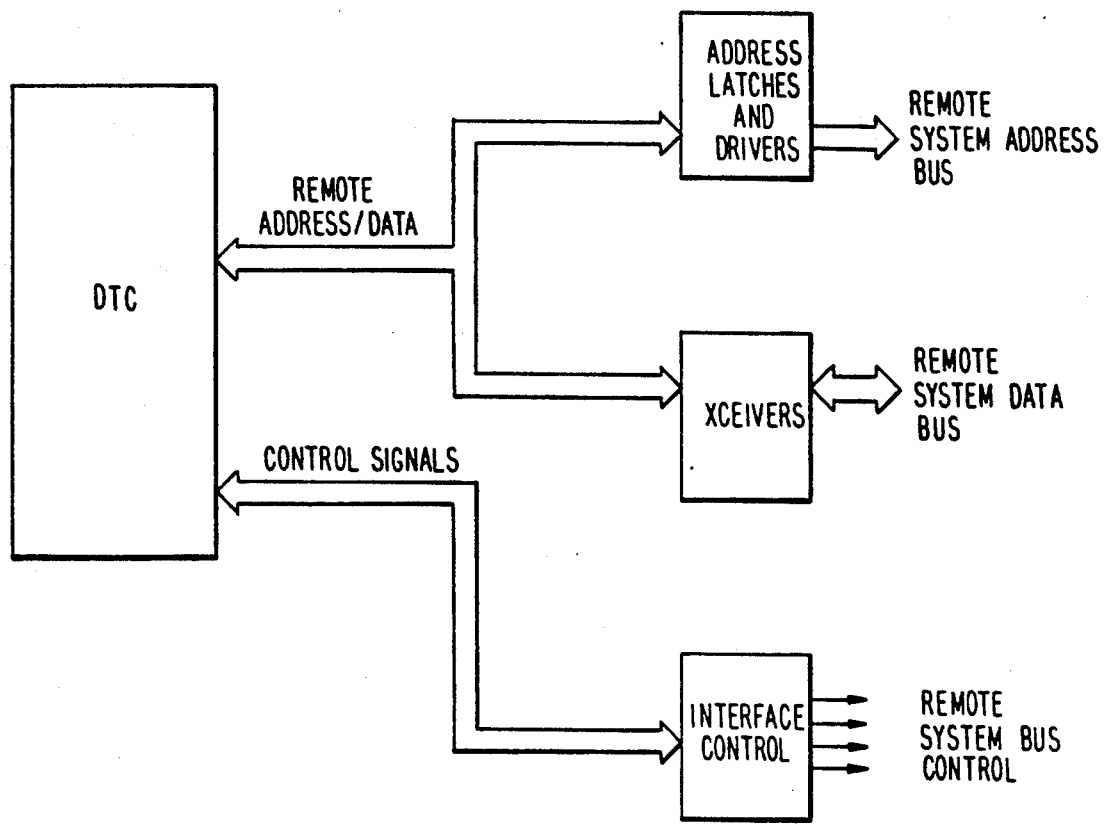
FIG. 10 is an example of how commercially available devices may be used to interconnect the novel DTC to the Remote Bus.

FIG. 10 depicts a typical Remote Bus connection with commercially available latches, drivers, transceivers and control interface, for coupling remote data and address signals and control signals, to remote system address, data and control buses. However, in some cases (e.g. to provide low cost attachments to the Remote Bus), it can be advantageous to remove the bus interfacing logic between the Remote Bus and peripherals, and control the peripheral directly. The DTC facilitates the design of such a system, by supporting programmable bus timing per I/O port or DMA channel. This eliminates the need for any timing implemented by interfacing circuits.

DTC controlled bus timing is programmed via the Remote Wait Count (RWC) and Remote Recovery Count (RRC) fields of a Channel Mode Register or Port Mode Register. The RWC field specifies (as indicated hereinbefore) the number of cycles (above one cycle) in the data cycle for a transfer. The RRC specifies the number of cycles (possibly zero) between the end of the data cycle and the beginning of the next data cycle (note that an address cycle preceeds the data cycle for non-block mode transfers). The timing controlled by these fields is enabled by the Data Size Acknowledge Disable (DAD) bit of the Channel Mode Register or Port Mode Register.

When DTC controlled bus timing is enabled for a particular I/O port or DMA channel, the DTC ignores DSACK0-DSACK1 for any Remote Bus access via the I/O port or channel, and relies on the values of the RWC and RRC fields to time the access on the Remote Bus. Since DSACK0-DSACK1 are ignored, the proper data width must be programmed in the appropriate Channel Mode Register or Port Mode Register.

The DTC still responds to *RBERR and *EOP when it is enabled to generate bus timing. The assertion of either of these signals terminates the data cycle regardless of the value of the RWC field and has the usual effect otherwise.

Next, it should be understood that the logical operation of the remote bus does not depend on whether the bus has synchronous or asynchronous operation. The signals used to control an access have the same interpretation in either case. However, there are two essential differences in the physical implementation of the asynchronous bus, compared to the synchronous bus:

1. The inputs to the DTC which control the asynchronous bus have protection against metastable states. This protection requires internal synchronization, which adds to the time required for a bus access.
2. On the asynchronous bus, all transitions on the primary handshake signals DSACK0-DSACK1, *RBERR and *EOP must be recognized and synchronized by the DTC. In contrast, these signals are sampled on the synchronous bus, and not extra time is required for synchronizing transitions.

The requirements on the asynchronous bus in general cause it to operate at a slower rate than the synchronous bus. This is the result of metastable synchronization time, and the fact that both transitions of handshaking signals must be synchronized.

For either the synchronous or asynchronous bus, the addresss cycle is synchronous. The DTC relies on the fact that an address can be transferred in a single RCLK cycle. This synchronous transfer is hidden by the external address latch.

The signals DSACK0-DSACK1 are allowed to be skewed on the asynchronous bus. A transition on either of these signals causes a data cycle to end after the synchronization period. However, if the other signal changes during the synchronization period, the DTC accepts the change, as long as it occurs with a valid setup time with respect to RCLK. Other signals which end a data cycle (IRBERR, *EOP) may be similarly skewed.

Figure 11A:
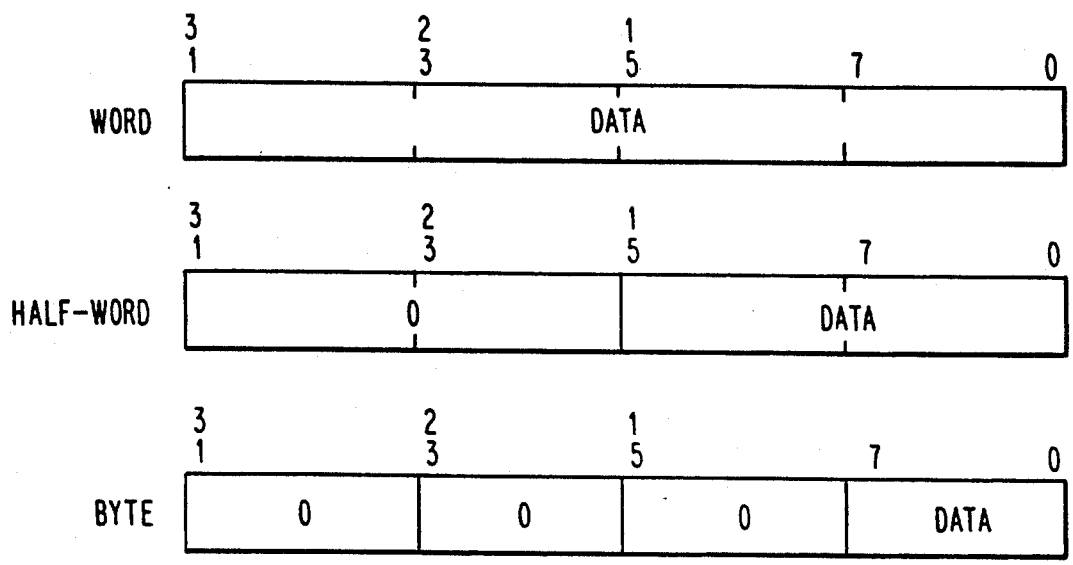
FIG. 11 illustrates data location for Local Bus data transfers, on D0-D31, both to and from the novel DTC.
Figure 11B:
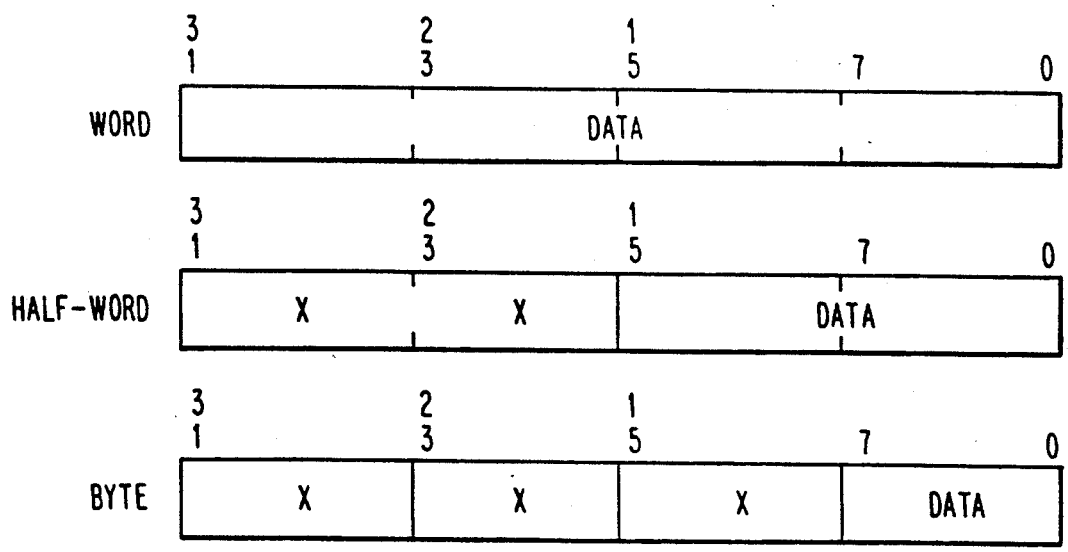
Figure 12A:
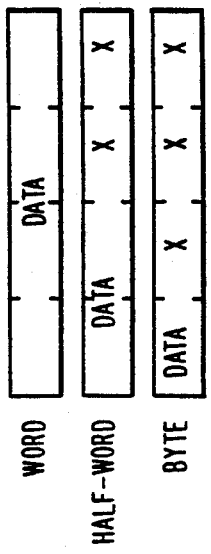
FIG. 12 illustrates data location for Remote Bus data transfers, on RAD0-RAD31, both to and from the novel DTC.
Figure 12C:
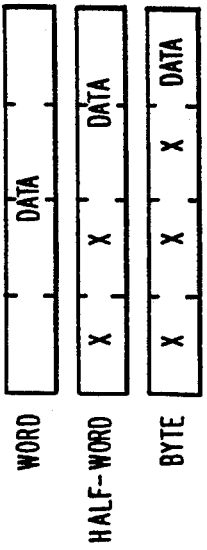
Figure 12B:
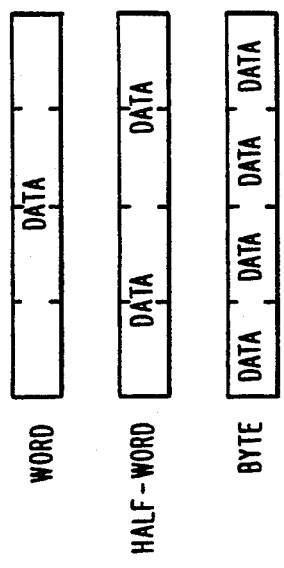
Figure 12D:
Figure 12E:
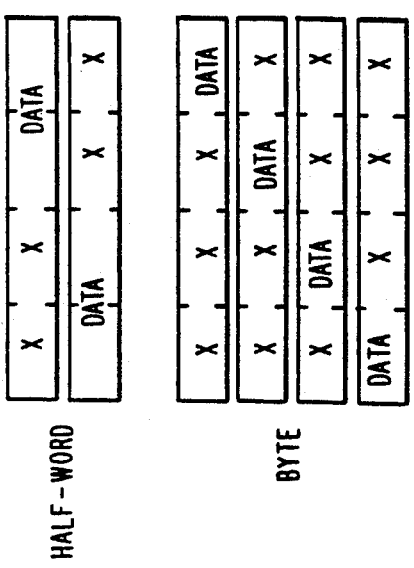

An additional system consideration is the "before" and "after" view of data transferred via the DTC. FIGS. 11 and 12 are presented to illustrate data location for both Local Bus and Remote Bus data transfers to and from the novel DTC.

FIG. 11 summarizes the various possibilities for the location of data on the Local Bus.

When a byte or half-word of data is transferred from the DTC on the Local Bus, it is right justified with respect to the Local Bus. Thus, a byte appears on D7-D0, and a half-word appears on D15-D0. The remaining bus signals are, according to the preferred embodiment of the invention, driven LOW.

When a byte or half-word of data is transferred to the DTC from the Local Bus, it is right justified with respect to that bus. Thus, a byte appears on D7-D0, and a half-word appears on D15-D0. The remaining bus signals are ignored.

FIG. 12 summarizes the various possibilities for the location of data on the Remote Bus.

When a byte or half-word of data is transferred from the DTC to a device or memory on the Remote Bus, it is replicated in each byte or half word position on the Remote Bus. Thus, a byte appears on RAD31-RAD24, RAD23-RAD16, RAD15-RAD8, and RAD7-RAD0. A half-word appears on RAD31-RAD16 and RAD15-RAD0.

When a byte or half-word of data is transferred to the DTC from the Remote Bus, it appears on the bus at a position determined by the Data Location field of the Channel Mode Register or Port Mode Register associated with the transfer. Four possible alignments are supported:

1. By address. A byte of half-word appears on the bus at a position determined by its address.
2. Fixed high. A byte or half-word is left justified with respect to the bus.
3. Fixed low. A byte or half-word is right justified with respect to the bus.
4. Fixed low/bytes by address. A half-word is right justified with respect to the bus, and bytes appear within the low order 16 bits of the bus as determined by their addresses.

It should be noted that when the position of a byte or half-word depends upon its address (options 1 and 4), the actual position of a particular byte or half-word is determined not only by the address, but also the byte and half-word order as specified by the Remote Byte Order (RBO) bit of the appropriate Channel Mode or Port Mode register. It should also be noted that with respect to, each of the above options, any bus signals not involved in a transfer are ignored.

It should now be clear that the DTC incorporates two primary interfaces to the system; the Local Bus and the Remote Bus. These interfaces permit a variety of different system configurations. Each interface typically operates with an independent clock.

In accordance with the preferred embodiment of the invention, being described in the context of operating with (or within) a RISC system, Local Bus operation is synchronous to the SYSCLK input. This input is either driven by the SYSCLK output of the RISC processor or is driven by a separate clock generator which also drives the SYSCLK input of the RISC processor.

Remote Bus operation is timed with the RCLK signal (Remote Bus operation may be either synchronous or asynchronous to RCLK). The DTC supports two methods of system clock generation and distribution.

In one clocking arrangement, the DTC generates RCLK clock for the Remote Bus; this clock appears on the RCLK pin, and may be distributed externally to other Remote Bus components. In the second arrangement, there is independent clock generation for the Remote Bus; in this case, the DTC receives an externally generated clock on the RCLK pin. In both arrangements, the circuits which generate and buffer RCLK are designed to minimize the apparent skew between internal DTC clocks and external Remote Bus clocks.

The DTC provides a power supply pin for the RCLK driver which is independent of all other chip power distribution. This electrically isolates other DTC circuits from noise which might be induced on the power supply by the RCLK driver. The separate power supply is also used to decide between the two possible clocking arrangements.

If power (i.e. +5 volts) is applied to the RCLK power supply pin, the DTC is configured to generate clocks for the Remote Bus. In this case, the RCLK pin is an output, and the signal on ROSC is used to generate the Remote Bus clock. The DTC divides the ROSC signal by two in the generation of RCLK, so ROSC should be driven at twice the operating frequency of the Remote Bus.

If the RCLK power supply pin is grounded, the DTC is configured to receive an externally generated clock. In this case, the RCLK pin is an input used directly as the DTC clock. RCLK should be driven at the operating frequency of the Remote Bus. In this configuration, the ROSC input should be tied HIGH or LOW, except in certain master/slave configurations as discussed hereinafter.

The RCLK pin is HIGH during the first half of the Remote Bus clock cycle, and LOW during the second half or the Remote Bus cycle. Thus, a cycle begins on a LOW to HIGH transition of RCLK. The definition of the beginning of the Remote Bus clock cycle is independent of the clocking arrangement chosen for a particular system.

In some systems, it might be desirable to have two or more DTC's operate in lock step synchronization, with each driven by a common ROSC signal. In this case, synchronization is achieved by the *RESET input. If the deassertion of *RESET meets a specified set up time with respect to the LOW to HIGH transition of ROSC, the RCLK output is guaranteed to be LOW in the next half-cycle. Thus, all DTC's may be synchronized as required.

As far as DTC electrical specifications are concerned (with respect to RCLK), they are different than the specifications for most other DTC inputs and outputs. In order to reduce clock-skew effects, the RCLK pin is electrically compatible with CMOS circuits, rather than being compatible with TTL circuits used to fabricate a DTC chip.

Note that the RCLK pin is placed in the high-impedance state by the Test mode (to be described hereinafter). If an externally generated clock is not supplied in this case, DTC state may be lost.

The Test mode allows DTC outputs to be driven directly for DTC testing or diagnostic purposes. The Test mode places all outputs (except MSERR) into the high-impedance state, so that they do not interfere electrically with externally supplied signals. In all other respects, DTC operation is unchanged.

The Test mode is invoked by an active level on the *TEST input. The disabling of DTC outputs is performed combinatorially. It occurs even though no clocks are applied to the DTC.

For some outputs, the transition to the high-impedance state which results from the Test mode may occur at a much slower rate than applies during normal DTC operation (for example, when the DTC relinquishes the Local Bus). For this reason, the Test mode may not be appropriate for special, user defined purposes.

Another system consideration is that each DTC output has associated logic which compares the signal on the output with the signal which the DTC is providing internally to the output driver. The comparison between the two signals is made any time a given driver is enabled, and any time the driver is disabled only because of the Test mode. If, when the comparison is made, the output of a driver does not agree with its input, the DTC asserts the MSERR output on the next of SYSCLK or RCLK, depending whether the error is detected on the Local Bus or Remote Bus.

When the DTC asserts MSERR, it takes no other actions with respect to the detected miscomparison. However, MSERR may be used externally to perform any system function, including the generation of a trap.

Figure 13:
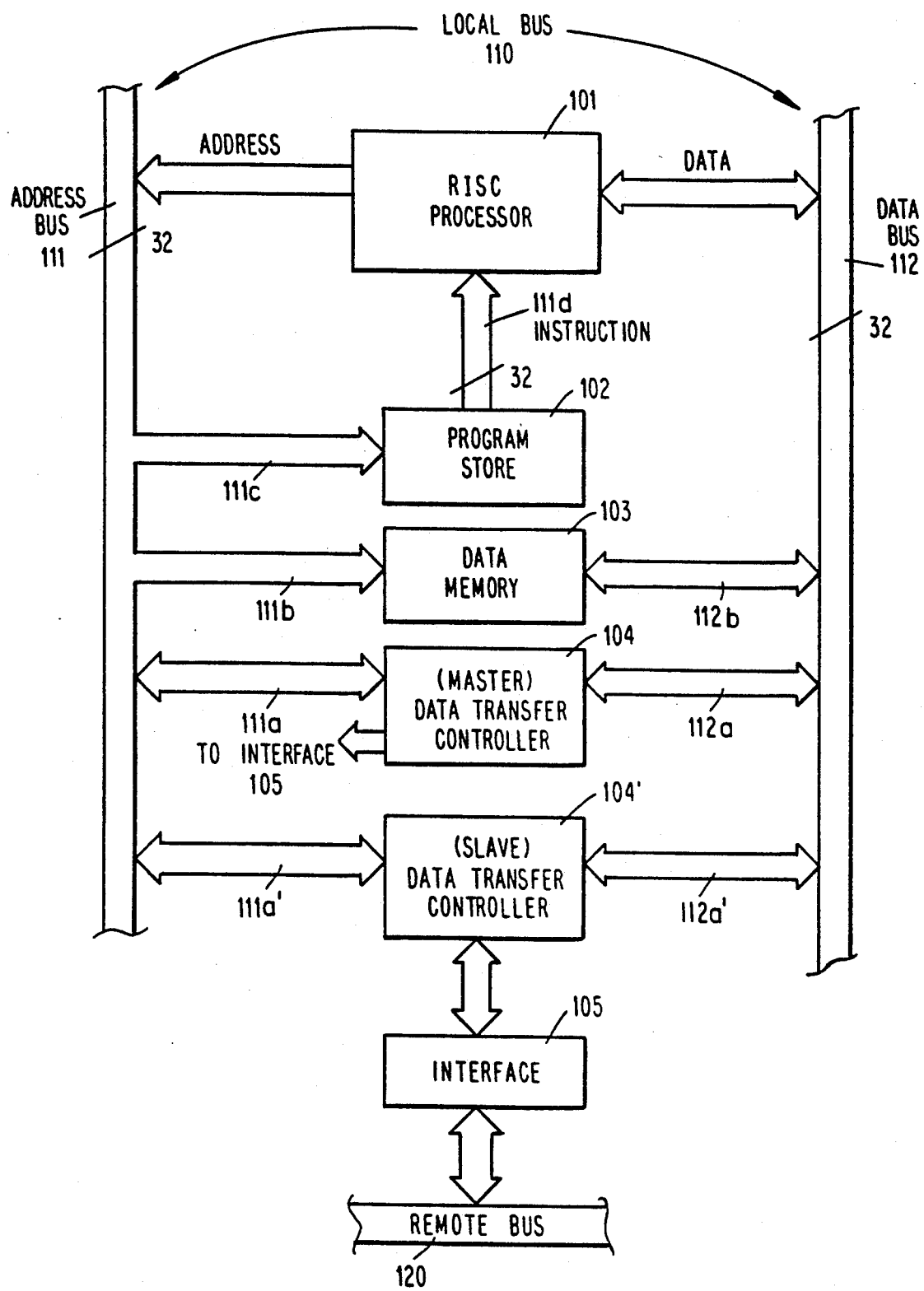
FIG. 13 illustrates a system incorporating a master DTC and a slave DTC.

It there is a single DTC in the system, the MSERR output indicates that a DTC driver is faulty, or that there is a short circuit in a DTC output. However, a much higher level of fault detection is possible if a second DTC (called "slave") is connected in parallel with the first (called a "master"), where the slave DTC has outputs disabled by the Test mode. FIG. 13 illustrates a system incorporating a master DTC 104 and a slave DTC 104'.

The slave DTC, by comparing its outputs to the outputs of the master, performs a comprehensive check of the operation of the master. In addition, the slave may detect open circuits and other faults in the electrical paths used by the master to communicate with the system. Note that the master still performs the comparison on its outputs in this configuration.

When two DTC's are connected in a master/salve configuration, it is necessary to prevent spurious assertions of MSERR. These result from situations where the outputs of the slave DTC do not agree with the outputs of the master, but both are operating correctly.

One source of spurious errors can be unpredictable values for unimplemented bits in DTC registers. This potential problem has been avoided by the preferred DTC architecture in which all unimplemented bits are read as 0.

A second source of spurious errors concerns data transferred from the Remote Bus to the Local Bus. In certain cases, the DTC transfers data which is a "don't care"; for example, when a single byte is transferred from the Local Bus via an I/O port. If the ignored-data inputs are not at a valid logic level and if they are eventually reflected on another bus, two DTC's may not agree on the values, for the data, because of the invalid logic levels. The DTC avoids this problem by padding data with zeros and by replicating data to mask "don't cares."

Another source of spurious errors is a lack of synchronization between the master and slave DTCs. To maintain synchronization between the master and slave, it is first necessary that they operate with identical clocks. This is accomplished by having the master drive RCLK, with the slave receiving RCLK as an input, or by driving both master and slave with the same externally generated RCLK.

However, the fact that both master and slave DTCs operate with the same clock is not sufficient to guarantee synchronization. Asynchronous inputs may affect the master a cycle sooner or later than they affect the slave. For this reason, the Remote Bus must have shynchronous operation in a master/slave configuration, or be externally synchronized at a common point. Note also that the active-to-inactive transition of *RESET must be synchronized.

In some master/slave configurations, it might be desirable to give the slave DTC control over the system when an error is isolated to the master DTC. It is possible to grant control to the slave by taking it out of the Test mode, and placing the master into the Test mode. Synchronization must be maintained when this is accomplished.

If the original master is configured to generate RCLK in this case, the slave must also generate RCLK when it becomes a master. Because of this, the ROSC signal must be supplied to both the master and slave, with both being configured to generate clocks.

In this master/slave configuration, the slave still receives RCLK from the master as described previously. The slave does not drive RCLK becuase of the Test mode. However, when the slave is taken out of the Test mode, it is able to drive RCLK as required. One of ordinary skill in the art will appreciate that the switching scheme described hereinabove may be generalized to more than two DTCs.

As a final system consideration it should be pointed out that some standard buses support a dynamic bus sizing operation, where the data width for a transfer is determined dynamically during the transfer. The DTC does not support this function directly, but provides the features necessary to support it at a higher level.

When the DTC receives a response to a transfer which indicates that the requested transfer cannot be performed (either by DSACK0-DSACK1 of *RBERR), it causes a trap or interrupt to the RISC processor. For an I/O port access, the DTC responds with *DERR, and for a DMA channel, the DTC asserts *INTR (if interrupts are enabled).

The responding interrupt or trap handler has the option of reducing the data width on the indicated I/O port or DMA channel, or allocating another I/O port or DMA channel to handle the smaller data width. The Data Size Acknowledge field of the appropriate Port Status Register or Channel Status Register indicates the DSACK0-DSACK1 response which caused the error. The original transfer can be restarted.

It should be noted that, if the data width of an I/O port or DMA channel is reduced, all transfers via that I/O port or DMA channel are treated as having the specified width. For example, transfers to a word device are performed a byte at a time if the width of the I/O port or DMA channel is specified as 8 bits. This is considered a valid operation, and does not cause an exception. Hence, the DTC supports a dynamic reduction in data width, but not a dynamic increase in data width.

For an I/O port performing read-ahead or write-behind, the data width exception is reported after it has occurred on the Remote Bus, and both that access and the access receiving the *DERR response must be restarted. In this case, the first access must be restarted explicitly by a load or store, using the untranslated I/O port address in the Local Port Address Register. The second access is restarted by the Channel Address, Channel Data and Channel Control registers in the RISC processor. It should be noted that the first access may be restarted in either the User or Supervisor modes, since any protection violation would have been caught previously.

Having described the novel DTC in detail herein in terms of function, its internal register, inputs and outputs, data formats and transfers supported, etc., one of ordinary skill in the art will appreciate that the objectives of the invention, set forth hereinbefore, have been met.

The foregoing description of a preferred embodiment and illustrative examples of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. A reduced instruction set processing (RISC) system comprising:

a set of high performance devices including a RISC processor unit coupled to a Local bus; a program storage unit coupled to said Local bus and to said processor unit by an instruction bus; a data storage unit coupled to said Local bus; and at least one data transfer controller (DTC) that is coupled to said Local bus and to a Remote bus, said DTC having means for performing overlapped input/output, whereby the DTC can simultaneously service a second I/O request from said processor unit before the completion of a first I/O request, completing both I/O requests without interruption, said Remote bus being coupled to a second set of devices have a comparatively lower performance level than said first set of devices;

said DTC comprising a direct memory access means, coupled to said Local bus, including at least one direct memory access channel means, for channelling direct memory access transfers from said Local bus to said Remote bus and from said Remote bus to said Local bus; input/output controller means, coupled to said Local bus and to said Remote bus, including at least one address mapped input/output port means, for providing direct access to said second set of devices by said processor unit; means for connecting said Local bus to said direct memory access means and to said input/output controller means; and packing and funneling network means for interconnecting said Remote bus to said direct memory access means and said input/output controller means to accommodate variable width data transfers between said Local Bus and said Remote bus;

wherein said DTC facilitates communication between said first and second sets of devices while insulating the performance of said first set of devices from the lower performance of said second set of devices and permits data transfer operations to be performed by said direct memory access means and said input/output controller means in parallel with the operation of said first set of devices.

2. A RISC system as set forth in claim 1, further comprising transfer means, including multiplexing means, coupled between said packing and funneling network means, said direct memory access means, said input/output controller means and to said Remote Bus, for multiplexing address and data signals being transferred to said Remote Bus.

3. A RISC system as set forth in claim 2 wherein said transfer means includes a transceiver, coupled between said multiplexing means and said Remote Bus, for transmitting and receiving signals being transferred to and from said Remote Bus.

4. A RISC system as set forth in claim 3 wherein said at least one DTC supports the performance of a burst mode access protocol by said RISC processor.

5. A RISC system as set forth in claim 1, wherein said RISC system includes a plurality of DTCs and each of said DTCs may be operated in a master mode and in a slave mode, with respect to another DTC in said RISC system.

6. A RISC system as set forth in claim 5 wherein a pair of said plurality of DTCs is configured in a master/slave relationship.

7. A RISC system as set forth in claim 6 further comprising means for switching control to the slave DTC of said pair when an error is isolated in the master DTC of said pair.

8. A RISC system as set forth in claim 5 wherein a given one of said plurality of DTCs operates as a Local Bus master.

9. A RISC system as set forth in claim 5 wherein a given one of said plurality of DTCs operates as a Local Bus slave.

* * * * *